US009995857B2

United States Patent
Evans et al.

(10) Patent No.: US 9,995,857 B2
(45) Date of Patent: Jun. 12, 2018

(54) SYSTEM, APPARATUS, AND METHOD FOR DISPLAYING AN IMAGE USING FOCAL MODULATION

(71) Applicant: Avegant Corp., Belmont, CA (US)

(72) Inventors: Allan Thomas Evans, San Francisco, CA (US); Andrew John Gross, Redwood City, CA (US)

(73) Assignee: Avegant Corp., Belmont, CA (US)

( * ) Notice: Subject to any disclaimer, the term of this patent is extended or adjusted under 35 U.S.C. 154(b) by 0 days. days.

(21) Appl. No.: 14/678,875

(22) Filed: Apr. 3, 2015

(65) Prior Publication Data

US 2016/0295202 A1    Oct. 6, 2016

(51) Int. Cl.
| | | |
|---|---|---|
| G02B 27/00 | (2006.01) | |
| G02B 3/14 | (2006.01) | |
| H04N 13/04 | (2006.01) | |
| G02B 27/01 | (2006.01) | |
| H04N 13/02 | (2006.01) | |
| G06F 3/01 | (2006.01) | |

(52) U.S. Cl.
CPC .............. *G02B 3/14* (2013.01); *G02B 27/017* (2013.01); *G02B 27/0172* (2013.01); *H04N 13/0217* (2013.01); *H04N 13/042* (2013.01); *H04N 13/0459* (2013.01); *H04N 13/0484* (2013.01); *G02B 2027/014* (2013.01); *G02B 2027/0187* (2013.01); *G06F 3/011* (2013.01); *G06F 3/013* (2013.01)

(58) Field of Classification Search
CPC .... G02B 27/017; G02B 27/0172; G02B 3/14; G02B 2027/0127; G02B 2027/014; G02B 2027/0178; G02B 2027/0187; G06F 3/011; G06F 3/013; G06T 19/006
See application file for complete search history.

(56) References Cited

U.S. PATENT DOCUMENTS

| 2,149,341 A | 3/1939 | Harrison |
|---|---|---|
| D132,442 S | 5/1942 | Montgomery |

(Continued)

FOREIGN PATENT DOCUMENTS

| CA | 2257445 A1 | 7/1999 |
|---|---|---|
| CN | 2651774 | 10/2004 |

(Continued)

OTHER PUBLICATIONS

Chapter 2-Principles of Stereoscopic Depth Perception and Reproduction, 2007.

(Continued)

*Primary Examiner* — Sultan Chowdhury
*Assistant Examiner* — Magda Cruz
(74) *Attorney, Agent, or Firm* — HIPLegal LLP; Judith Szepesi

(57) ABSTRACT

A system (100), apparatus (110), and method (900) for displaying an image (880). The light (800) in the image (880) is modified by a tuning assembly (700) to possess more than one focal point (870). Thus a single image (880) can include multiple depth regions (860). Each depth region (860) can be comprised of light (800) possessing a distinct focal point (870). The tuning assembly (700) can be implemented in the form a tunable lens (710), a tunable lens array (720), a movable lens (730), or a deformable mirror (740).

21 Claims, 25 Drawing Sheets

(56) References Cited

U.S. PATENT DOCUMENTS

| | | |
|---|---|---|
| 3,356,439 A | 12/1967 | Magnus |
| D246,259 S | 11/1977 | Nishimura et al. |
| D254,183 S | 2/1980 | Doodson |
| D262,019 S | 11/1981 | Upshaw |
| D270,634 S | 9/1983 | Ungar |
| 4,459,470 A | 7/1984 | Shlichta et al. |
| 4,553,534 A | 11/1985 | Stiegler |
| 4,859,030 A | 8/1989 | Rotier |
| 4,961,626 A | 10/1990 | Fournier et al. |
| D313,092 S | 12/1990 | Nilsson |
| 5,047,006 A | 9/1991 | Brandston et al. |
| 5,095,382 A | 3/1992 | Abe |
| 5,106,179 A | 4/1992 | Kamaya et al. |
| D328,461 S | 8/1992 | Daido et al. |
| 5,140,977 A | 8/1992 | Raffel |
| D338,010 S | 8/1993 | Yamatogi |
| 5,266,070 A | 11/1993 | Hagiwara et al. |
| 5,303,085 A | 4/1994 | Rallison |
| 5,467,104 A | 11/1995 | Furness et al. |
| 5,552,922 A | 9/1996 | Magarill |
| 5,624,156 A | 4/1997 | Leal et al. |
| D388,114 S | 12/1997 | Ferro |
| 5,794,127 A | 8/1998 | Lansang |
| 5,844,656 A | 12/1998 | Ronzani et al. |
| 5,886,822 A | 3/1999 | Spitzer |
| 5,915,783 A | 6/1999 | McDowell et al. |
| 5,931,534 A | 8/1999 | Hutter |
| 5,945,965 A | 8/1999 | Inoguchi et al. |
| 5,984,477 A | 11/1999 | Weissman et al. |
| 5,991,085 A | 11/1999 | Rallison et al. |
| 5,991,087 A | 11/1999 | Rallison |
| 6,008,781 A | 12/1999 | Furness et al. |
| 6,016,385 A | 1/2000 | Yee et al. |
| 6,097,543 A | 8/2000 | Rallison et al. |
| 6,185,045 B1 | 2/2001 | Hanano |
| 6,342,871 B1 | 1/2002 | Takeyama |
| 6,351,252 B1 | 2/2002 | Atsumi et al. |
| 6,386,706 B1 | 5/2002 | McClure et al. |
| 6,437,915 B2 | 8/2002 | Moseley et al. |
| D467,580 S | 12/2002 | Mori |
| D484,485 S | 12/2003 | Matsuoka |
| 6,678,897 B2 | 1/2004 | Lindgren |
| 6,721,750 B1 | 4/2004 | Jones et al. |
| 6,724,906 B2 | 4/2004 | Naksen et al. |
| 6,932,090 B1 | 8/2005 | Reschke et al. |
| 7,245,735 B2 | 7/2007 | Han |
| 7,275,826 B2 | 10/2007 | Liang |
| D556,187 S | 11/2007 | Feng |
| D560,654 S | 1/2008 | Feng |
| D567,215 S | 4/2008 | Lee |
| D570,825 S | 6/2008 | Schultz et al. |
| 7,388,960 B2 | 6/2008 | Kuo et al. |
| 7,431,392 B2 | 10/2008 | Tamara |
| 7,483,200 B1 | 1/2009 | Pan |
| D587,683 S | 3/2009 | Ham et al. |
| 7,604,348 B2 | 10/2009 | Jacobs et al. |
| 7,697,203 B2 | 4/2010 | Cha et al. |
| 7,735,154 B2 | 6/2010 | Gellis et al. |
| D632,668 S | 2/2011 | Brunner et al. |
| D638,397 S | 5/2011 | McManigal |
| D640,256 S | 6/2011 | So |
| 7,959,296 B2 | 6/2011 | Cowan et al. |
| 8,006,320 B1 | 8/2011 | Rohbani |
| 8,057,036 B2 | 11/2011 | Hess et al. |
| 8,094,120 B2 | 1/2012 | Ratai |
| 8,094,927 B2 | 1/2012 | Jin et al. |
| 8,106,938 B2 | 1/2012 | Tzschoppe |
| D656,480 S | 3/2012 | McManigal et al. |
| 8,144,079 B2 | 3/2012 | Mather et al. |
| 8,144,274 B2 | 3/2012 | Lee |
| D657,344 S | 4/2012 | Brunner et al. |
| 8,149,342 B2 | 4/2012 | Ijzerman et al. |
| 8,154,800 B2 | 4/2012 | Kean et al. |
| 8,162,482 B2 | 4/2012 | DeCusatis et al. |
| D660,823 S | 5/2012 | Hardi et al. |
| D660,824 S | 5/2012 | Hardi et al. |
| 8,194,058 B2 | 6/2012 | Shestak et al. |
| 8,208,715 B2 | 6/2012 | Lau et al. |
| 8,212,810 B2 | 7/2012 | Naske et al. |
| 8,243,126 B2 | 8/2012 | Louwsma et al. |
| 8,244,027 B2 | 8/2012 | Takahashi |
| 8,284,235 B2 | 10/2012 | Held et al. |
| D673,136 S | 12/2012 | Kelly et al. |
| D673,520 S | 1/2013 | Tan |
| D674,767 S | 1/2013 | Brunner et al. |
| 8,362,974 B2 | 1/2013 | Miyake et al. |
| D675,595 S | 2/2013 | Cho et al. |
| D683,329 S | 5/2013 | Hagelin |
| 8,451,229 B2 | 5/2013 | Otsuki et al. |
| 8,508,830 B1 | 8/2013 | Wang |
| 8,545,013 B2 | 10/2013 | Hwang et al. |
| D693,791 S | 11/2013 | Troy |
| D695,263 S | 12/2013 | Mogili |
| 8,605,935 B1 | 12/2013 | Huang |
| D697,495 S | 1/2014 | Lian |
| D699,702 S | 2/2014 | Chen |
| D704,704 S | 5/2014 | Tatara et al. |
| D709,880 S | 7/2014 | Kim et al. |
| D715,255 S | 10/2014 | Nunez et al. |
| D720,721 S | 1/2015 | Lu |
| D722,041 S | 2/2015 | Sparks et al. |
| 8,964,298 B2 | 2/2015 | Haddick et al. |
| D724,560 S | 3/2015 | Galler |
| D727,278 S | 4/2015 | Solomon et al. |
| D727,280 S | 4/2015 | Levine |
| D727,281 S | 4/2015 | Levine |
| D727,288 S | 4/2015 | Yamasaki et al. |
| D728,512 S | 5/2015 | Nakagawa |
| D729,196 S | 5/2015 | Liu |
| D729,198 S | 5/2015 | Brunner et al. |
| 9,036,849 B2 | 5/2015 | Thompson et al. |
| 9,042,948 B2 | 5/2015 | Serota |
| D733,090 S | 6/2015 | Petersen |
| 9,158,115 B1 | 10/2015 | Worley et al. |
| 9,223,136 B1 | 12/2015 | Braun et al. |
| 9,529,191 B2 | 12/2016 | Sverdrup et al. |
| 9,603,457 B2 | 3/2017 | Massaud et al. |
| 2002/0070590 A1 | 6/2002 | Carstens |
| 2002/0089469 A1 | 7/2002 | Cone et al. |
| 2002/0175880 A1 | 11/2002 | Melville et al. |
| 2002/0186180 A1 | 12/2002 | Duda |
| 2003/0058209 A1 | 3/2003 | Balogh |
| 2003/0095081 A1 | 5/2003 | Furness et al. |
| 2003/0164814 A1 | 9/2003 | Starkweather et al. |
| 2003/0210801 A1 | 11/2003 | Naksen et al. |
| 2003/0227465 A1 | 12/2003 | Morgan et al. |
| 2004/0113867 A1 | 6/2004 | Tomine et al. |
| 2005/0116922 A1 | 6/2005 | Kim |
| 2005/0195277 A1 | 9/2005 | Yamasaki |
| 2005/0206583 A1 | 9/2005 | Lemelson et al. |
| 2006/0028400 A1 | 2/2006 | Lapstun et al. |
| 2006/0087618 A1 | 4/2006 | Smart et al. |
| 2006/0181482 A1 | 8/2006 | Iaquinto |
| 2006/0181484 A1 | 8/2006 | Sprague et al. |
| 2006/0238717 A1 | 10/2006 | Maximus et al. |
| 2007/0081248 A1 | 4/2007 | Wu |
| 2007/0091272 A1 | 4/2007 | Lerner et al. |
| 2007/0093118 A1 | 4/2007 | Pond et al. |
| 2007/0097277 A1 | 5/2007 | Hong et al. |
| 2007/0273983 A1 | 11/2007 | Hebert |
| 2008/0158672 A1 | 7/2008 | McCosky |
| 2009/0015917 A1 | 1/2009 | Iwamoto et al. |
| 2009/0039692 A1 | 2/2009 | Tuckey et al. |
| 2009/0152915 A1 | 6/2009 | Krasna et al. |
| 2009/0206641 A1 | 8/2009 | Brown |
| 2009/0262044 A1 | 10/2009 | Otsuki et al. |
| 2009/0276238 A1 | 11/2009 | Filipovich et al. |
| 2010/0007852 A1 | 1/2010 | Bietry et al. |
| 2010/0053729 A1 | 3/2010 | Tilleman et al. |
| 2010/0073469 A1 | 3/2010 | Fateh |
| 2010/0103676 A1 | 4/2010 | Noeth |
| 2010/0182688 A1 | 7/2010 | Kim et al. |
| 2010/0231579 A1 | 9/2010 | Kanbayashi et al. |
| 2010/0301640 A1 | 12/2010 | Heiser |

(56) References Cited

U.S. PATENT DOCUMENTS

| | | |
|---|---|---|
| 2011/0002533 A1 | 1/2011 | Inoue et al. |
| 2011/0007132 A1 | 1/2011 | Redmann et al. |
| 2011/0018903 A1 | 1/2011 | Lapstun et al. |
| 2011/0037829 A1 | 2/2011 | Hata |
| 2011/0044046 A1 | 2/2011 | Abu-Ageel |
| 2011/0063203 A1 | 3/2011 | Hong |
| 2011/0085727 A1 | 4/2011 | Yoon et al. |
| 2011/0086747 A1 | 4/2011 | Broderick |
| 2011/0096147 A1 | 4/2011 | Yamazaki et al. |
| 2011/0109133 A1 | 5/2011 | Galbreath et al. |
| 2011/0134229 A1 | 6/2011 | Matsumoto et al. |
| 2011/0134497 A1 | 6/2011 | Horimai |
| 2011/0141240 A1 | 6/2011 | Dutta et al. |
| 2011/0141244 A1 | 6/2011 | Vos et al. |
| 2011/0157696 A1 | 6/2011 | Bennett et al. |
| 2011/0193248 A1 | 8/2011 | Hsu |
| 2011/0227820 A1 | 9/2011 | Haddick et al. |
| 2011/0254834 A1 | 10/2011 | Jeon et al. |
| 2011/0273365 A1 | 11/2011 | West et al. |
| 2011/0273662 A1 | 11/2011 | Hwang et al. |
| 2012/0007800 A1 | 1/2012 | Jaroslaw |
| 2012/0033061 A1 | 2/2012 | Ko et al. |
| 2012/0050503 A1 | 3/2012 | Kraft |
| 2012/0059464 A1 | 3/2012 | Zhao |
| 2012/0069131 A1 | 3/2012 | Abelow |
| 2012/0084652 A1 | 4/2012 | Bauza et al. |
| 2012/0086917 A1 | 4/2012 | Okuda et al. |
| 2012/0105310 A1 | 5/2012 | Sverdrup et al. |
| 2012/0105740 A1 | 5/2012 | Jannard et al. |
| 2012/0120498 A1 | 5/2012 | Harrison et al. |
| 2012/0127062 A1* | 5/2012 | Bar-Zeev ............ G02B 3/14 345/6 |
| 2012/0195454 A1 | 8/2012 | Nishihara et al. |
| 2012/0212398 A1 | 8/2012 | Border et al. |
| 2012/0236030 A1 | 9/2012 | Border et al. |
| 2012/0244812 A1 | 9/2012 | Rosener |
| 2012/0262477 A1 | 10/2012 | Buchheit |
| 2012/0262549 A1 | 10/2012 | Ferguson |
| 2012/0262562 A1 | 10/2012 | Fukutake et al. |
| 2012/0280941 A1 | 11/2012 | Hu |
| 2012/0307357 A1 | 12/2012 | Choi et al. |
| 2013/0002660 A1 | 1/2013 | Chikazawa |
| 2013/0010055 A1 | 1/2013 | Raju et al. |
| 2013/0044939 A1 | 2/2013 | Li |
| 2013/0057961 A1 | 3/2013 | Evans et al. |
| 2013/0120265 A1 | 5/2013 | Horii et al. |
| 2013/0127980 A1 | 5/2013 | Haddick et al. |
| 2013/0147791 A1 | 6/2013 | Gilberton et al. |
| 2013/0160039 A1 | 6/2013 | Mentz et al. |
| 2013/0182086 A1 | 7/2013 | Evans et al. |
| 2013/0194244 A1 | 8/2013 | Tamir |
| 2013/0201080 A1 | 8/2013 | Evans et al. |
| 2013/0258463 A1 | 10/2013 | Evans et al. |
| 2013/0278631 A1 | 10/2013 | Border et al. |
| 2013/0293531 A1 | 11/2013 | Cao et al. |
| 2013/0307842 A1 | 11/2013 | Grinberg et al. |
| 2013/0314303 A1 | 11/2013 | Osterhout et al. |
| 2013/0314615 A1 | 11/2013 | Allen et al. |
| 2013/0342904 A1 | 12/2013 | Richards |
| 2014/0043320 A1 | 2/2014 | Tosaya et al. |
| 2014/0063055 A1 | 3/2014 | Osterhout et al. |
| 2014/0139652 A1 | 5/2014 | Aiden et al. |
| 2014/0139927 A1 | 5/2014 | Hiraide |
| 2014/0200079 A1 | 7/2014 | Bathiche et al. |
| 2014/0253698 A1 | 9/2014 | Evans et al. |
| 2015/0028755 A1 | 1/2015 | Chang et al. |
| 2015/0060811 A1 | 3/2015 | Shiratori |
| 2015/0091781 A1 | 4/2015 | Yu et al. |
| 2015/0097759 A1* | 4/2015 | Evans ............... H04R 1/028 345/8 |
| 2015/0103152 A1 | 4/2015 | Qin |
| 2015/0331246 A1 | 11/2015 | Dewald et al. |
| 2016/0018639 A1 | 1/2016 | Spitzer et al. |
| 2016/0033771 A1 | 2/2016 | Tremblay et al. |
| 2016/0195718 A1 | 7/2016 | Evans |
| 2016/0198133 A1 | 7/2016 | Evans |
| 2016/0291326 A1 | 10/2016 | Evans et al. |
| 2016/0292921 A1 | 10/2016 | Evans et al. |
| 2016/0295202 A1 | 10/2016 | Evans et al. |
| 2017/0068311 A1 | 3/2017 | Evans et al. |
| 2017/0139209 A9 | 5/2017 | Evans et al. |

FOREIGN PATENT DOCUMENTS

| | | |
|---|---|---|
| CN | 202306016 U | 7/2012 |
| JP | 2012253471 A | 12/2012 |
| WO | 2008070683 A1 | 6/2008 |
| WO | 2011097226 A1 | 8/2011 |
| WO | 2011137034 A1 | 11/2011 |
| WO | 2012000457 A1 | 1/2012 |
| WO | 2012098534 A1 | 7/2012 |
| WO | 2013012259 A2 | 1/2013 |

OTHER PUBLICATIONS

Rainbow Symphony, Pulfrich 3D Glasses, <http:/fwww.3dglasses. net/Pulfrich%203D%20Glasses.htm>, Retrieved on Jul. 27, 2016, 2 pages.

Ruxandra Serbanescu, "Polarization of light", 2009.

"Binocular Disparity", Collins English Dictionary, <http://www. dictionary.com/browse/binocular-disparity>, Retrieved on Apr. 11, 2016, 2 pages.

Qian, Ning, "Binocular Disparity and the Perception of Depth", Neuron, vol. 18, Mar. 1997, 359-368.

* cited by examiner

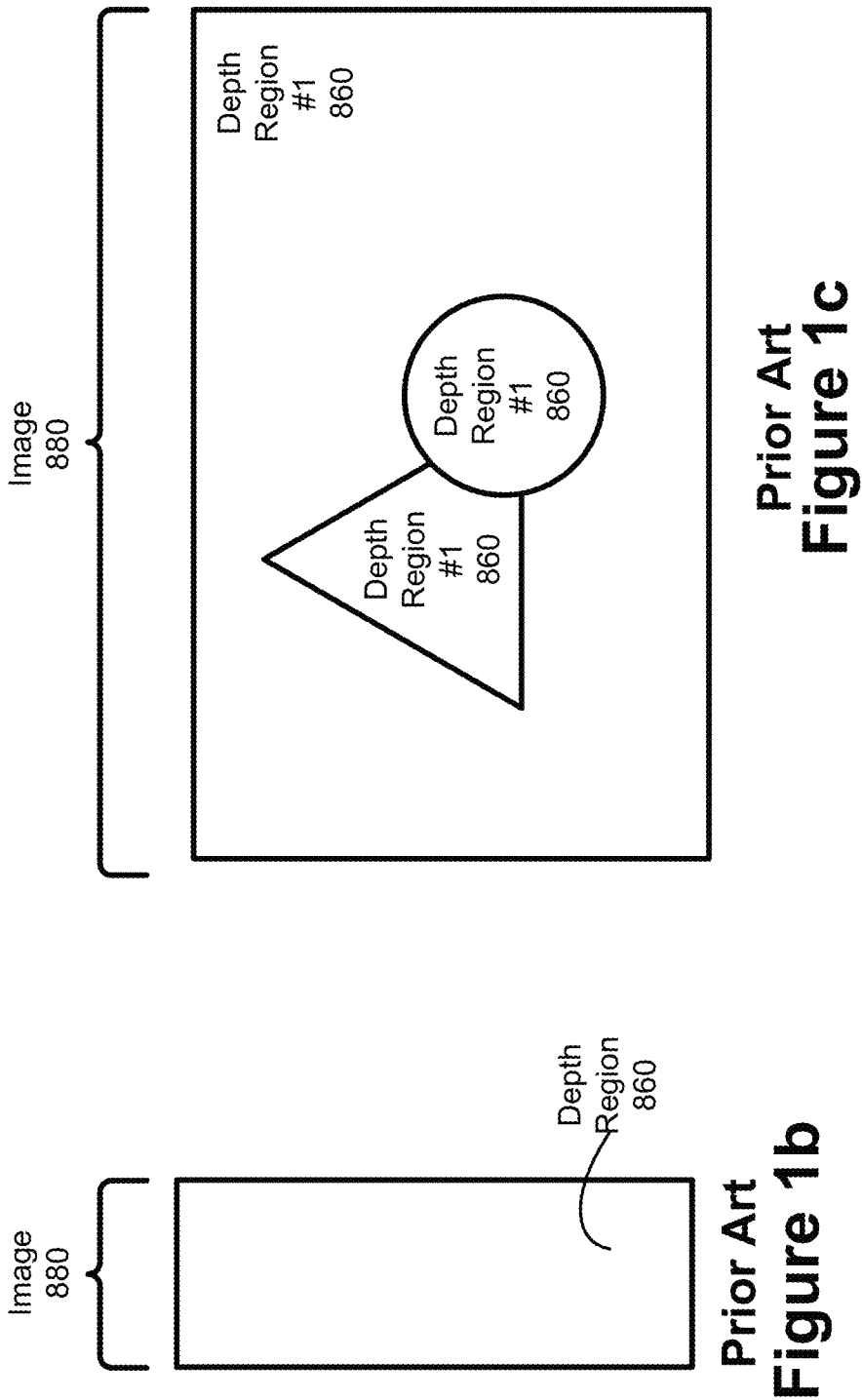

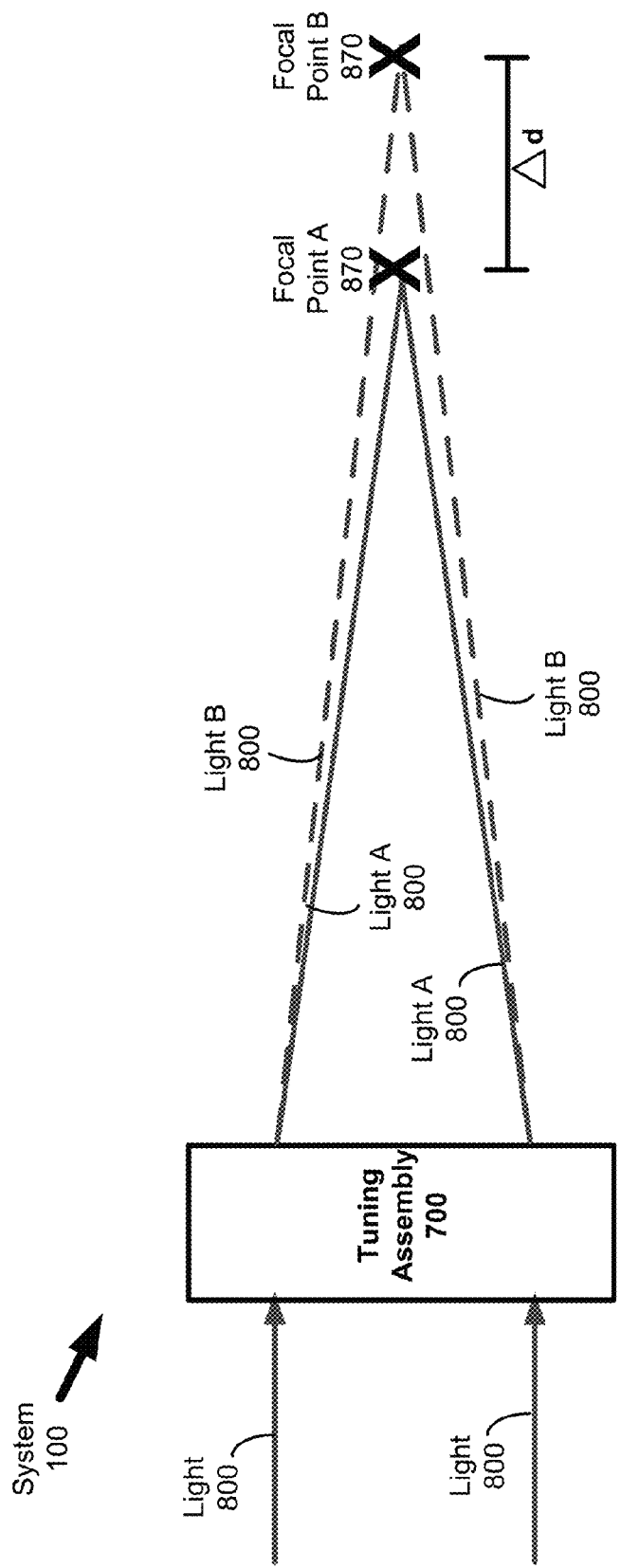

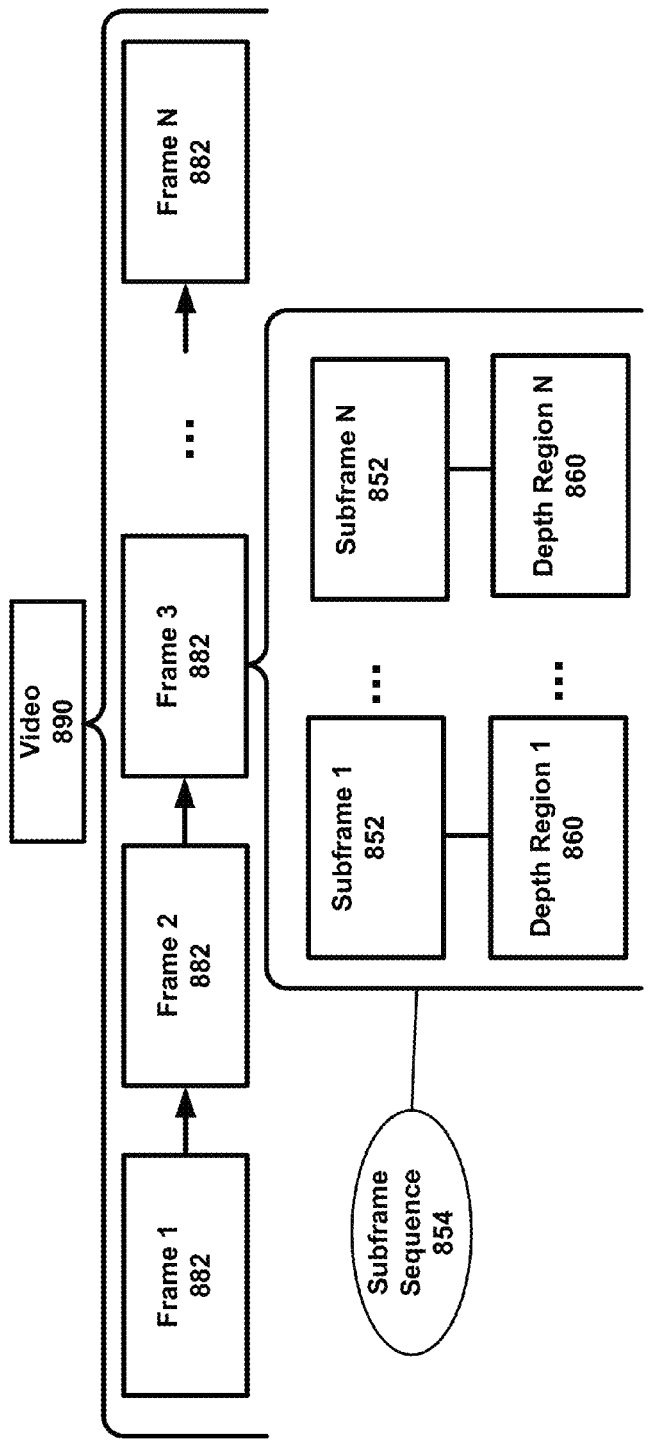
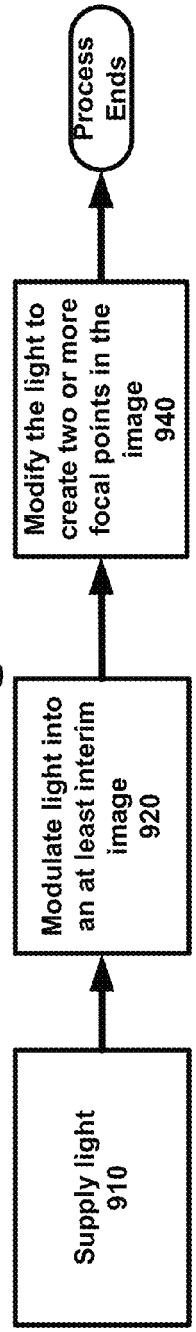

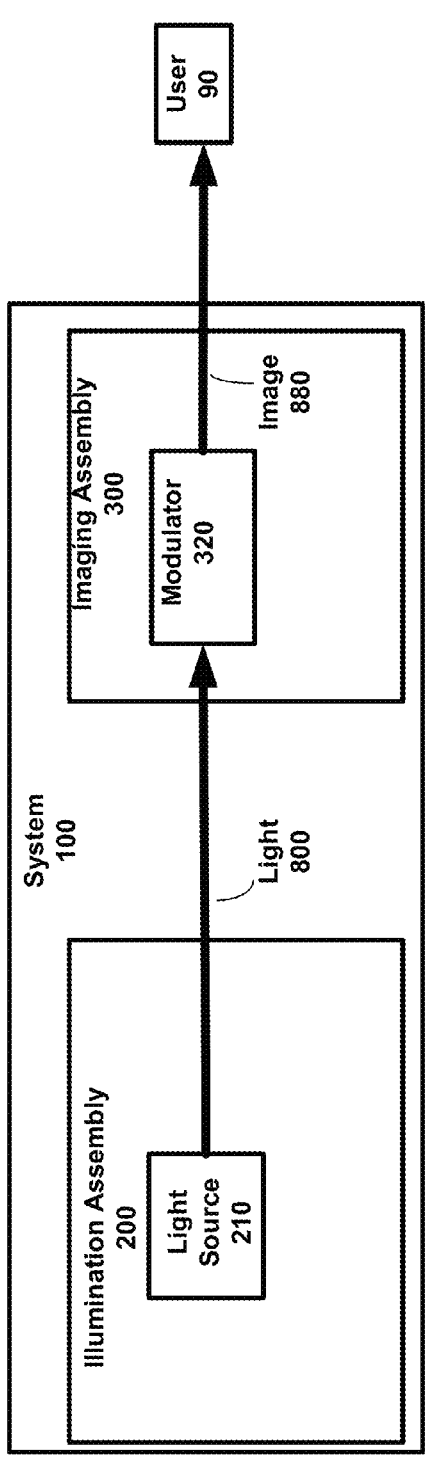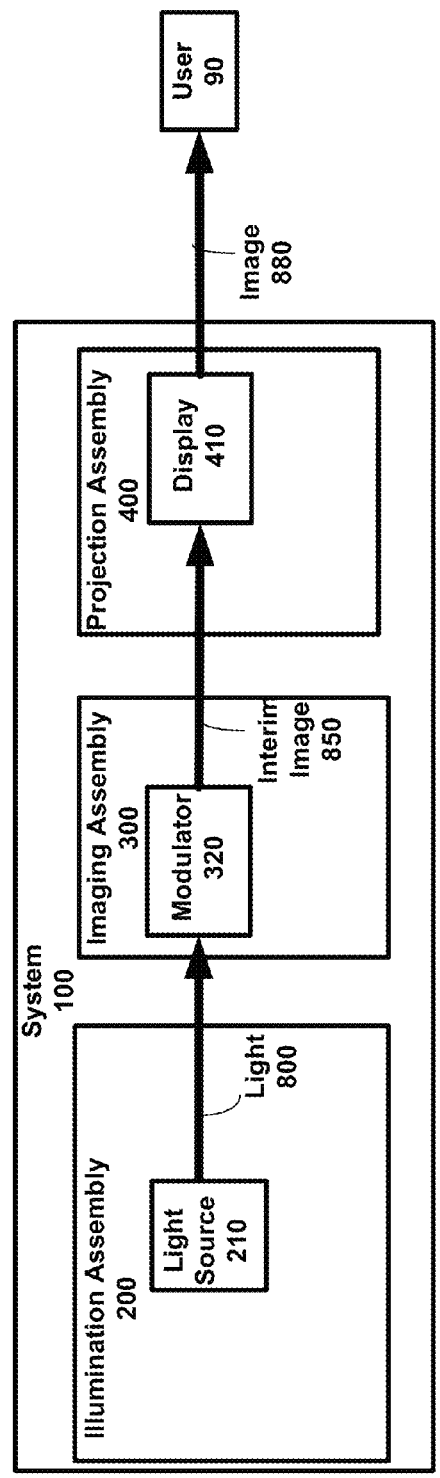
Figure 2a
Figure 2b

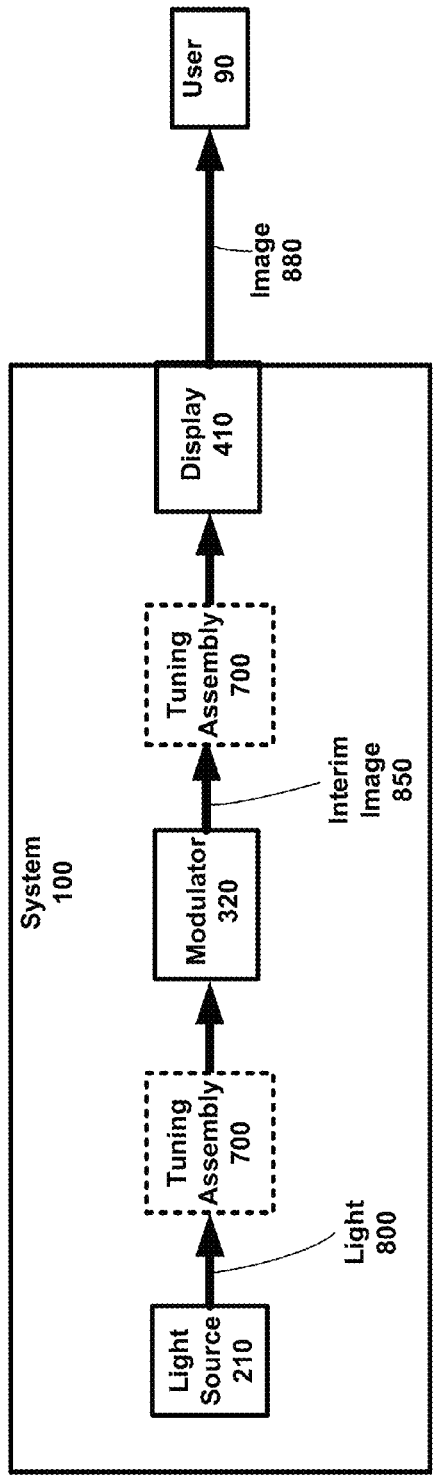
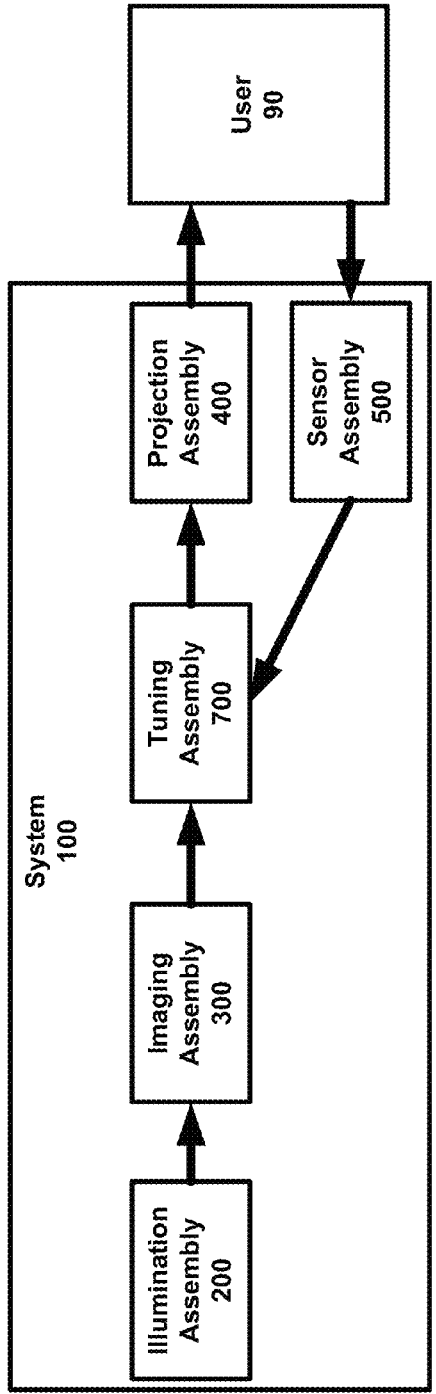

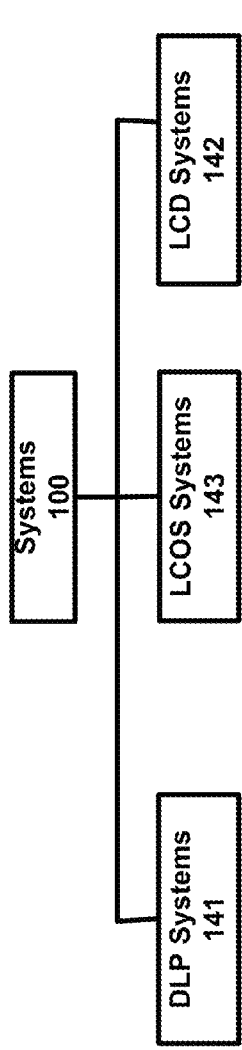
Figure 5d
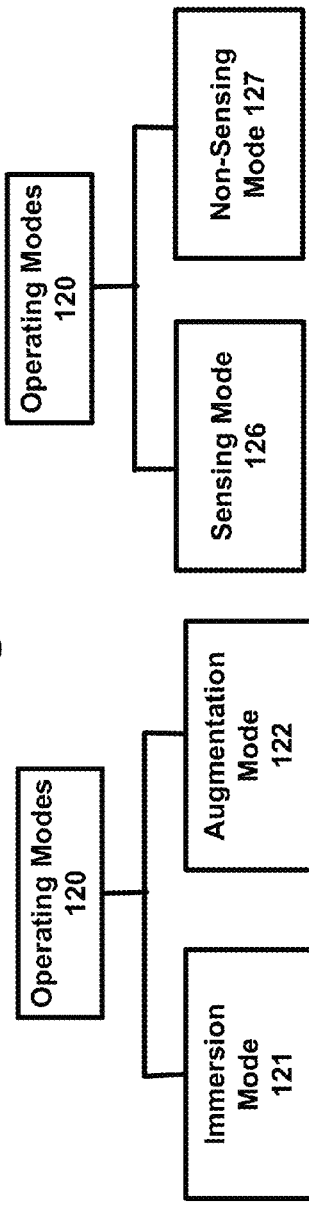
Figure 5e
Figure 5f
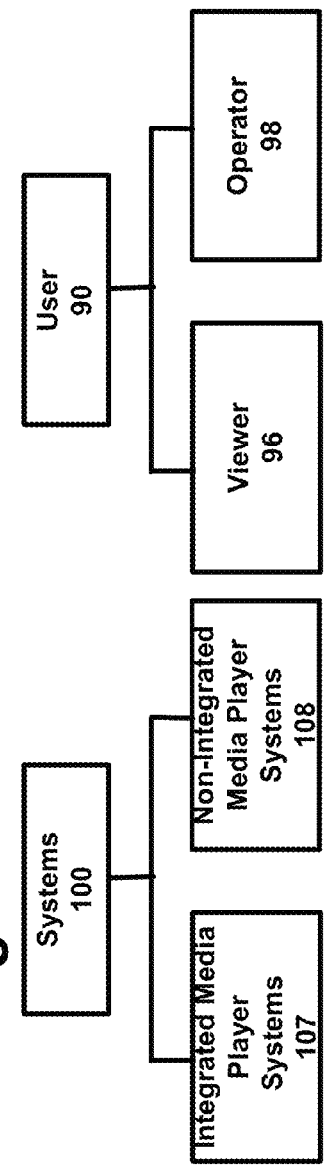
Figure 5g
Figure 5h

SYSTEM, APPARATUS, AND METHOD FOR DISPLAYING AN IMAGE USING FOCAL MODULATION

BACKGROUND OF THE INVENTION

The invention is system, method, and apparatus (collectively the "system") for displaying an image (collectively, the "system"). More specifically, the system uses a tuning assembly to modify the focal point of light in the displayed image. The system can display an image comprised of light with more than one focal point.

Human beings are used to interacting in a world of three dimensions. A single field of view of a human being may include images from objects less than 3 feet away, between 3-5 feet away, between 5-8 feet away, between 8-12 feet away, and further than 12 feet away. Eyes can rapidly change focus on different objects located at different distances. As some objects are brought into heightened focus, other objects may fall out of focus. When a human eye is focused an object that is 10 feet away, an adjacent object that is also 10 feet away can remain in sharp focus, an object merely 7 feet away may be somewhat blurred, and the image of an object merely two feet away is likely substantially blurred. Different images within the field of view have a different focal point and different focal length.

In contrast, prior art image display technologies display images using light that does not vary with respect to focal length or focal point. Prior art 3D technologies give an illusion of depth by presenting a separate image to each eye, but the images often appear unrealistic because the focal distance of all objects in the displayed image is the same, regardless of whether the image pertains to a small object within arms-reach or the view of the moon on the horizon. The illusion of depth can be enhanced somewhat by expressly blurring a background or foreground image, but such an approach does not allow the viewer to shift their focus to the blurred area.

Prior art image displays often provider viewers with unrealistic images because the focal point of light throughout the image is constant.

SUMMARY OF THE INVENTION

The invention is system, method, and apparatus (collectively the "system") for displaying an image (collectively, the "system"). More specifically, the system can use a tuning assembly to modify the focal point of light in the displayed image.

The system displays an image comprised of light with more than one focal point.

BRIEF DESCRIPTION OF THE DRAWINGS

Many features and inventive aspects of the system are illustrated in the various drawings described briefly below. However, no patent application can expressly disclose in words or in drawings, all of the potential embodiments of an invention. Variations of known equivalents are implicitly included. In accordance with the provisions of the patent statutes, the principles, functions, and modes of operation of the systems, apparatuses, and methods (collectively the "system") are explained and illustrated in certain preferred embodiments. However, it must be understood that the inventive systems may be practiced otherwise than is specifically explained and illustrated without departing from its spirit or scope. All components illustrated in the drawings below and associated with element numbers are named and described in Table 1 provided in the Detailed Description section.

FIG. 1b is a side view diagram illustrating an example of a prior art image that is comprised of a single uniform depth region.

FIG. 1c is a front view diagram illustrating an example of a prior art image that is comprised of a single uniform depth region.

FIG. 1d is a diagram illustrating an example of a tuning assembly changing the focal point of light that can be used to comprise a displayed image. FIG. 1d is in contrast to FIG. 1a.

FIG. 1f is in contrast to FIG. 1b.

FIG. 1g is in contrast to FIG. 1c.

FIG. 1h is a composition diagram illustrating an example of a video comprised of numerous frames, where each frame is comprised of one or more subframes with each subframe coinciding with a different depth region.

FIG. 1j is a diagram illustrating an example of tuning lens with a changeable curvature resulting in a changed focal point for the light passing through.

FIG. 1l is a diagram illustrating an example of a tuning assembly comprised of a tunable lens array.

FIG. 2a is a block diagram illustrating an example of different assemblies, components, and light that can be present in the operation of the system.

FIG. 2b is a block diagram similar to FIG. 2a, except that the disclosed system also includes a projection assembly.

FIG. 2c is a block diagram similar to FIG. 2b, except that a tuning assembly is included. The tuning assembly can be potentially positioned in any position after the light is generated by the light source.

FIG. 2d is a block diagram illustrating a system comprised of a variety of different assemblies, including an optional sensor assembly.

FIG. 5*d* is hierarchy diagram illustrating an example of different display/projection technologies that can be incorporated into the system, such as DLP-based applications.

FIG. 5*e* is a hierarchy diagram illustrating an example of different operating modes of the system pertaining to immersion and augmentation.

FIG. 5*f* is a hierarchy diagram illustrating an example of different operating modes of the system pertaining to the use of sensors to detect attributes of the user and/or the user's use of the system.

FIG. 5*g* is a hierarchy diagram illustrating an example of different categories of system implementation based on whether or not the device(s) are integrated with media player components.

FIG. 5*h* is hierarchy diagram illustrating an example of two roles or types of users, a viewer of an image and an operator of the system.

DETAILED DESCRIPTION

Figure 1A:
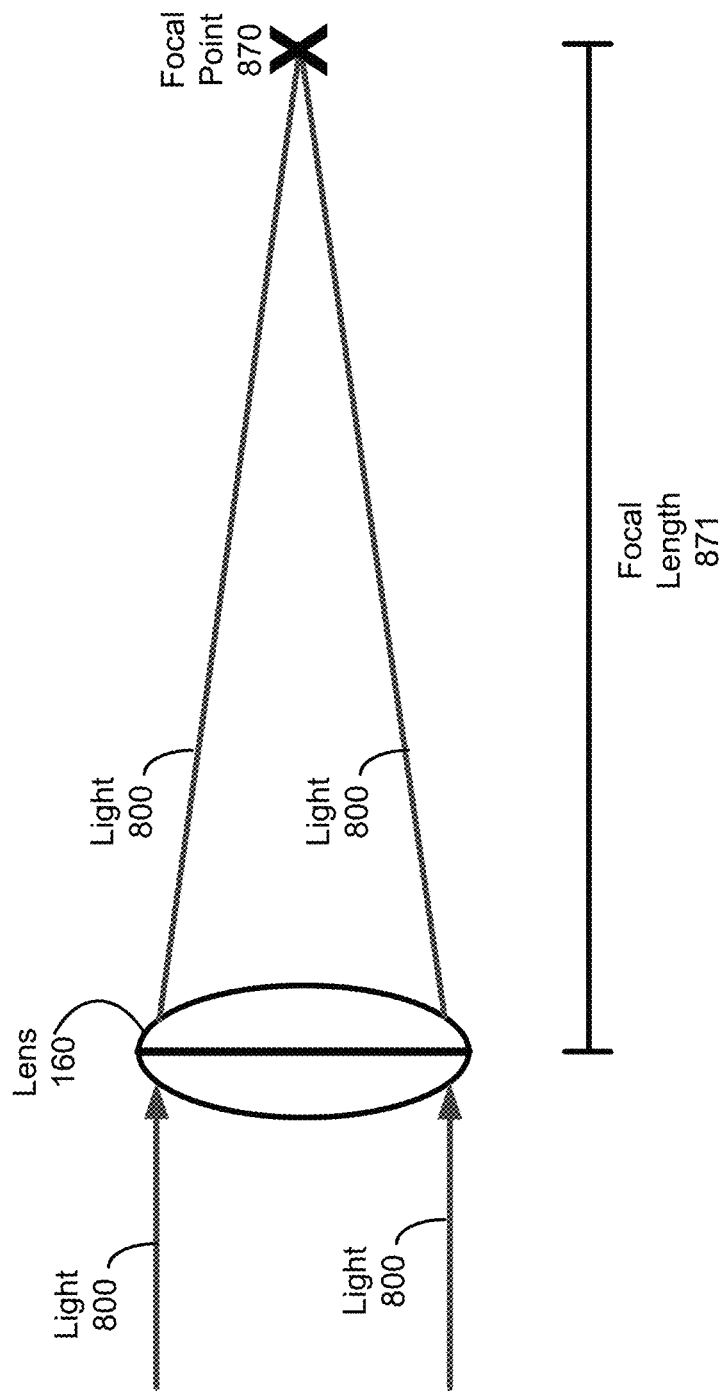
FIG. 1a is a diagram illustrating an example of a lens causing the light passing through the lens to converge at a focal point located a focal length away from the lens.

The invention is system, method, and apparatus (collectively the "system") for displaying an image (collectively, the "system"). More specifically, the system can use a tuning assembly to modify the focal point of light in the displayed image.

I. Overview

Prior art image display technologies often displays images that are unrealistic. In the real world, we encounter images from objects that are close by as well as from objects that are far distances away. Human beings are used to changing focus when we change from looking at something close to looking at something far away. Images originating from different distances involve different focal points and focal lengths. Focus far away, and the nearby images will blur. Focus nearby, and the far off images will blur. Displayed images are representations, imitations, or even simulations or reality, but the field of view in a displayed image will be comprised of one focal point and one focal length. Foreground or background may be artificially blurred, but the light used to display the image will be of a single focal point.

A system that can display an image comprised of light with more than focal point can be implemented in a variety of different ways. A single image can be broken into more than subframes. Each subframe can pertain to a portion of the displayed images. The various subframes can be displayed in a variety of different sequences and at sufficient speeds such that a viewer sees an integrated image with more than one focal point instead multiple partial images each with a single focal point. The concept of a video comprised of multiple still frame images works on the same basis. Each subframe within each frame of a video can be displayed quickly enough so that the viewer cannot distinctly perceive subframes of the image.

Different subframes of the image pertain to different depth regions within the image. So portions of the image that are far away from the viewer can be displayed in the same subframe while portions of the image that are close by can be displayed in their own subframe. Different embodiments of the system can involve a different number of subframes and a different number of depth regions. Some systems may only have two subframes and two depth regions. Other systems could have two, three, four, five, or even more subframes and depth regions in a single image. In many instances, it is believed that five depth regions are desirable, with region 1 being from 2-3 from the viewer, region 2 being from about 3-5 feet from the viewer, region 3 being from about 5-8 feet from the viewer, region for being from about 8-12 feet from the user, and region 4 being from about 12 or more feet from the user. Different embodiments of the system can involve different configurations of depth regions.

The ability of utilize light with more than one focal point in a single image can be implemented in interactive as well as non-interactive ways. In a non-interactive embodiment, depth regions are defined within the media itself. The movie, video game, or other type of content can within itself have these depth regions defined as pre-defined depth regions. The system can be implemented in an interactive manner by tracking the eye movement of the user. The system can identify which area of the image that the user is focusing on, use focused light for that area and unfocused light for the other areas. A third approach, which can be referred to as an interactive approach, involves the depth regions of the non-interactive approach combined with the user tracking functionality of an interactive approach. User attention is captured with respect to the pre-defined depth regions and the impact of that attention is factored into the displayed image based on the configuration of depth regions. So for example, if the user is focusing on something in depth region 1, depth regions 2-5 will displayed with increasing lack of focus.

A. Prior Art—Static Focal Uniformity within an Image

An optical system such as the human eye or a camera focuses on an image by having the light from that image converge to a single point referred to as a focal point. The display of an image works on a similar principle, but in reverse. FIG. 1a is a prior art diagram illustrating an example of various light 800 rays passing through a lens 160 which causes the light 800 to converge at a focal point 870. In a prior art image display system, all of the light 800 used to display the image shares the same focal point 870. A focal length 871 is the distance between the focal point 870 and the applicable lens 160. As illustrated in FIG. 1a, all of the light 800 shares the same focal point 870 and the same focal length. FIG. 1b is a prior art diagram illustrating a "side view" of a displayed image 880. The entire image 880 is comprised of a single depth region 860. FIG. 1c is a front view of the illustration in FIG. 1c. Although the image includes one object in front of another, with both objects being in front of a background, all three objects are illustrated with light 800 sharing the same depth region 860, i.e. light 800 of the same focal point 870.

B. Inventive System—Dynamic Focal Variation within an Image

Figure 1E:
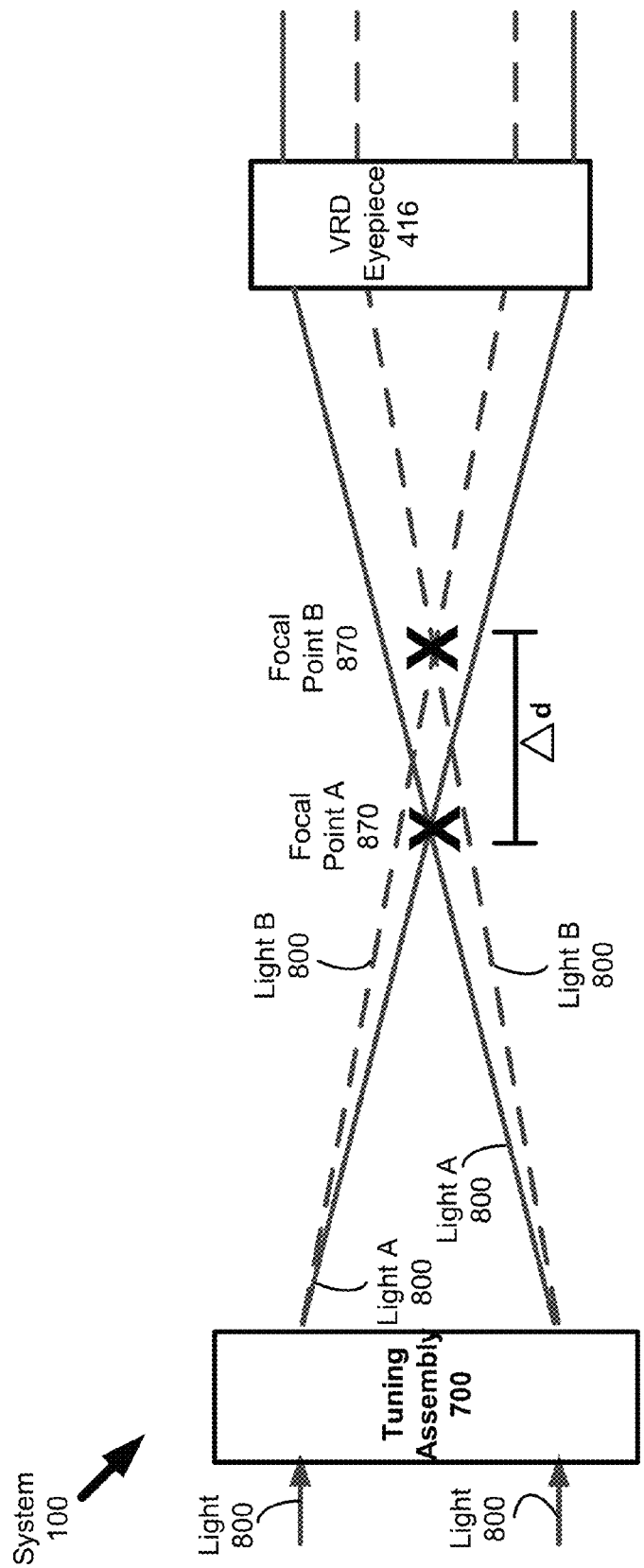
FIG. 1e is a diagram illustrating an example of tuning assembly changing the focal point of light that can be used to comprise a virtual image displayed to the viewer.

In contrast the FIGS. 1a-1c, the system can use light with more than one focal point within a single image. FIG. 1d, in contrast to FIG. 1a, illustrates an example of a system that uses light 800 with two distinct focal points 870 to comprise the image 880. Light ray A 800 has focal point A 870. Light ray B 800 has focal point B 870. The focal points are different, as are the focal lengths 871 because the focal length 871 is the different between the tuning assembly 700 and the focal point 870. FIG. 1e is a variation of FIG. 1d where the system 100 is implemented as a VRD system 106 or a VRD visor 116 that has a VRD eyepiece 416. Light ray A is a virtual part of the image that can appear at infinity while light ray B appears closer.

Figure 1G:
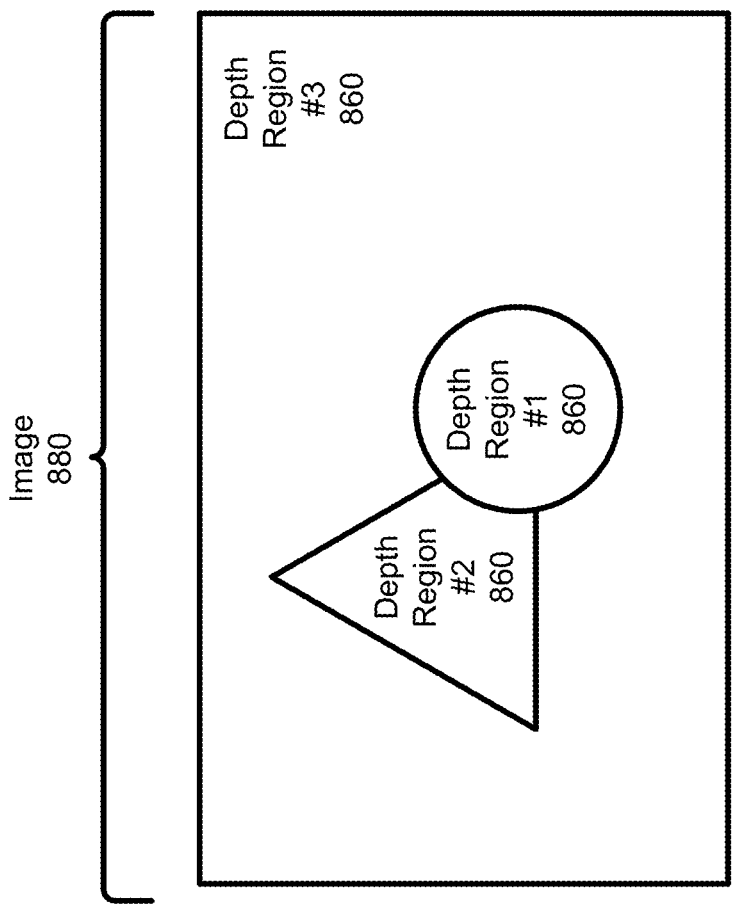
FIG. 1g is a front-view diagram illustrating an example of displayed image that is comprised of more than one depth region.
Figure 1F:
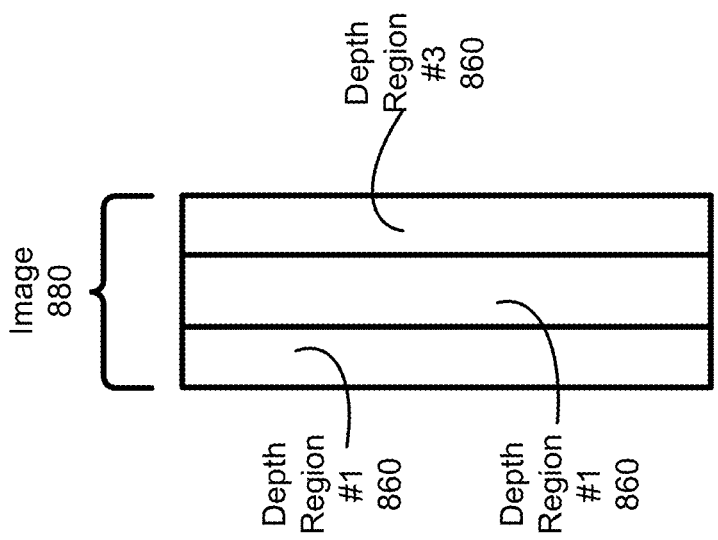
FIG. 1f is a side-view diagram that illustrates an example of a displayed image that is comprised of more than one depth region.

In contrast to FIG. 1b, FIG. 1f illustrates an example of an image 880 with multiple depth regions 860. In contrast to FIG. 1c, FIG. 1g illustrates an example of a displayed image 880 where depth region 1 is closer to the viewer than depth region 2, and both are closer than depth region 3. The image 880 in FIG. 1g is comprised of light with three distinct focal points. The image 880 in FIG. 1c is comprised of light with one uniform focal point.

If there is no focal variation with the light 800 in an individual image 880, then there is only one depth region 860 within that image 880. If there is focal variation with the light 800 in an individual image 880, then there are multiple depth regions 860 in that image 880.

C. Subframes and Depth Regions

As illustrated in FIG. 1h, an individual image 880 (as well as interim images 850) can be comprised of more than subimages or subframes 852. This is similar to how an individual video 890 can be comprised of more than one frames 882. Frames 882 are displayed in a sequence very quickly so that the viewer 96 sees one video 890, not a series of frames 882. The same technique can be utilized within the scope of a single image 880. With different portions of the image 880, which can be referred to as subframes 852 can be displayed quickly in a sequence. This allows the system 100 to include light 800 with more than one focal point 870 to be included in the same image. In such an approach, light 800 with focal point 870 A can be pulsed into subframe 1 582 that coincides with depth region 1 860, light 800 with focal point 870 B can be pulsed into subframe 2 582 that coincides with depth region 2 860, and so on and so forth.

The timing of subframes 852 can be coordinated with the pulses of light 800 from the light source 210 to create those subframes 852. The tuning assembly 700 can however be positioned at a wide variety of positions within the image display process after the light 800 has been created by the light source 210. Typically, the tuning assembly 700 will be positioned between the light source 210 and the modulator 320.

Some embodiments of the system 100 will can utilize predetermined depth regions 860 that are based solely on the media content and that do not "factor in" any eye tracking attribute 530 captured by the tracking/sensor assembly 500. Other embodiments may give primary importance to the eye-tracking attribute 530 of the viewer 96 and relatively little weight to depth regions 860 as defined within the media content itself. Still other embodiments may utilize a hybrid approach, in which user actions navigate the user within an image that is otherwise defined with respect to predefined depth regions 860. Some embodiments will allow the user 90 to determine which mode of operation is preferable, offering users 90 a menu of options with respect to the potential impact of an eye-tracking attribute 530 that is captured by the system 100.

D. Process Flow View

The system 100 can be described as a method 900 or process for displaying an image 880 with light includes more than one focal point 870.

At 910, light 800 is supplied or generated.

At 920, the light 800 from 910 is modulated into an image 880 (or at least an interim image 850 that is subject to further modification/focusing downstream).

At 940, modifying the light 800 in the image 880 (or interim image 850 in some circumstances) so that the light 800 comprising the final image 880 is comprised of more than one focal point 870. The process at 940 can be performed at a variety of different places in the light/modulation/projection process. The tuning assembly 700 can be positioned between the light source 210 and the modulator 320, between the modulator 320 and the projection assembly 400, or between the projection assembly 400 and the eye 92 of the user 90.

E. Tuning Assembly

Figure 2E:
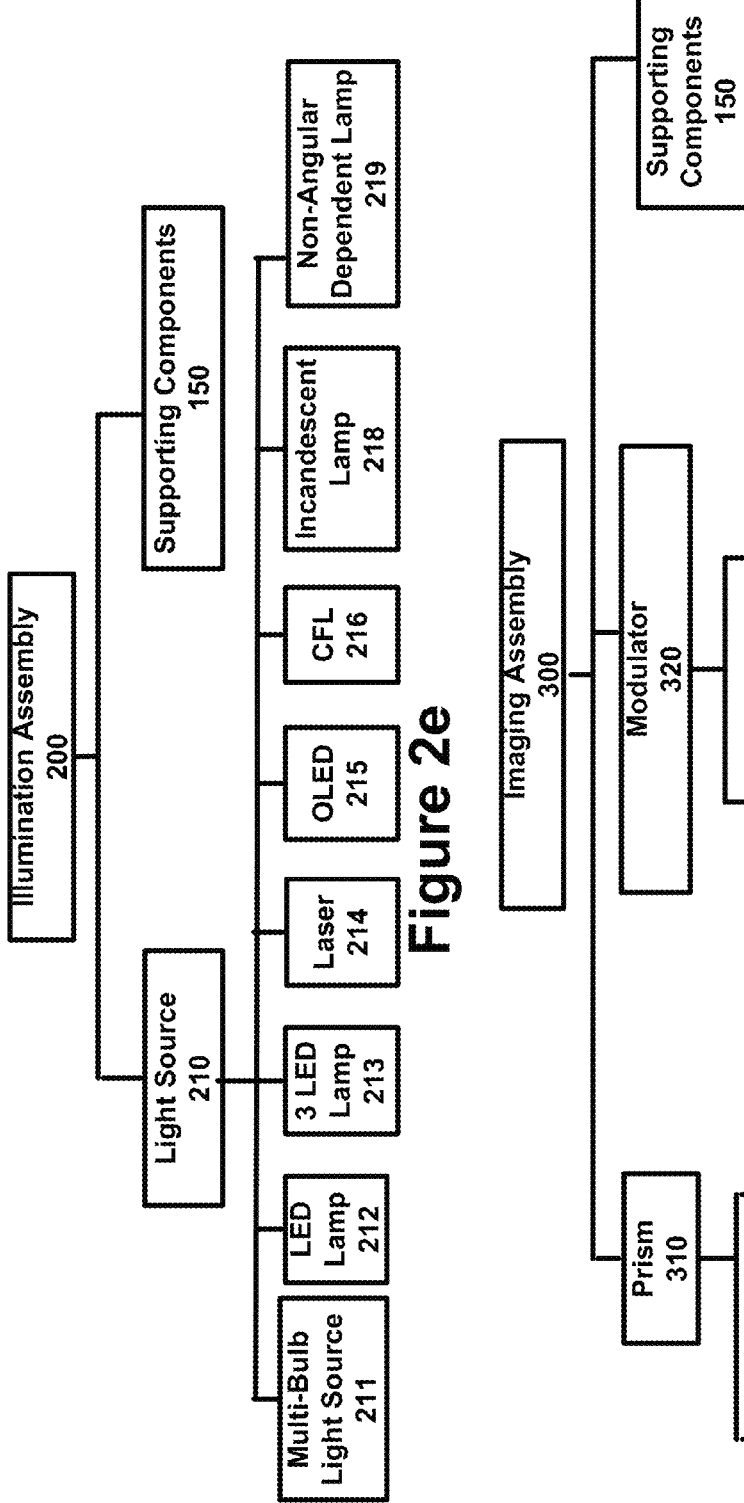
FIG. 2e is a hierarchy diagram illustrating an example of different components that can be included in an illumination assembly.

A tuning assembly 700 is the configuration of devices, components, and processes that allow the focal point 870 of light 800 making up the image 880 to be changed. FIG. 2i illustrates an example of different components that can be utilized within a tuning assembly 700 to change the focal point 870 of light 800 in an image 880. Use of the tuning assembly 700 allows a single image 880 to be comprised of light 800 with two or more different focal points 870. As illustrated in FIG. 2i, four categories of tuning assemblies include tunings lenses 710 (lenses for which the curvature 711 of the lens can be changed so that light 800 passing through travels to different focal points 870), tunable arrays 720 (configurations of two more non-dynamic lenses 160 where a splitter 724 is used to direct light 800 to different lenses with different curvatures 711), movable lenses 730 (lenses that move the focal point 870 by moving the lens but without changing the curvature 711 of the lens), and deformable mirrors 740 (mirrors with a tunable radius of curvature). Virtually any mechanism known in the prior art for changing the focal point 870 of light or for changing the curvature of a lens, mirror, or other optic can potentially be used by the tuning assembly 700.

1. Tuning Lens

Figure 1J:
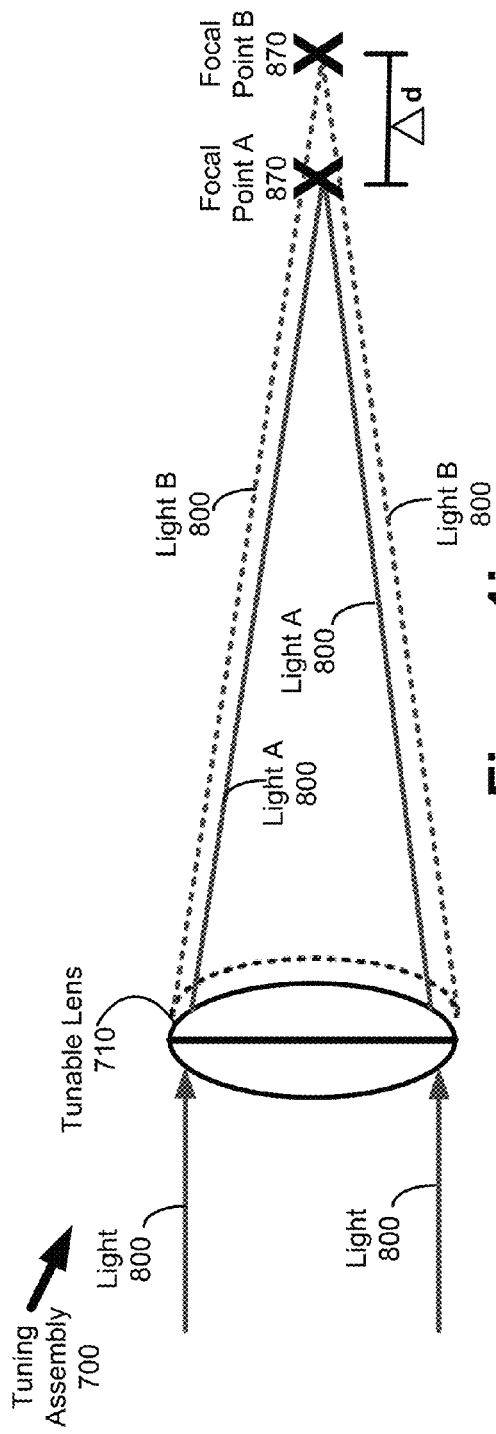

A tuning lens 710 is a lens that can have its curvature 711 changed so that the focal point 870 of light traveling through the lens 710 also changes. FIG. 1j is a diagram of a tuning lens 870 with an adjustable curvature 711 changing the focal point 870 of light 800 traveling through it.

Figure 1K:
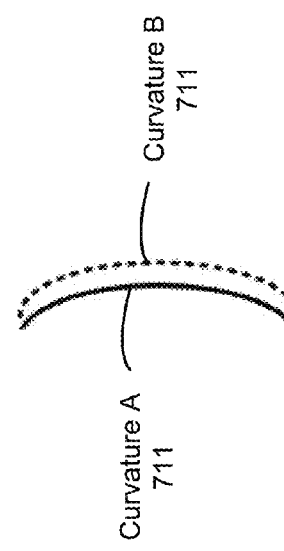
FIG. 1k is a diagram illustrating an example of a single tuning lens with more than one potential curvature for directing light.
Figure 1I:
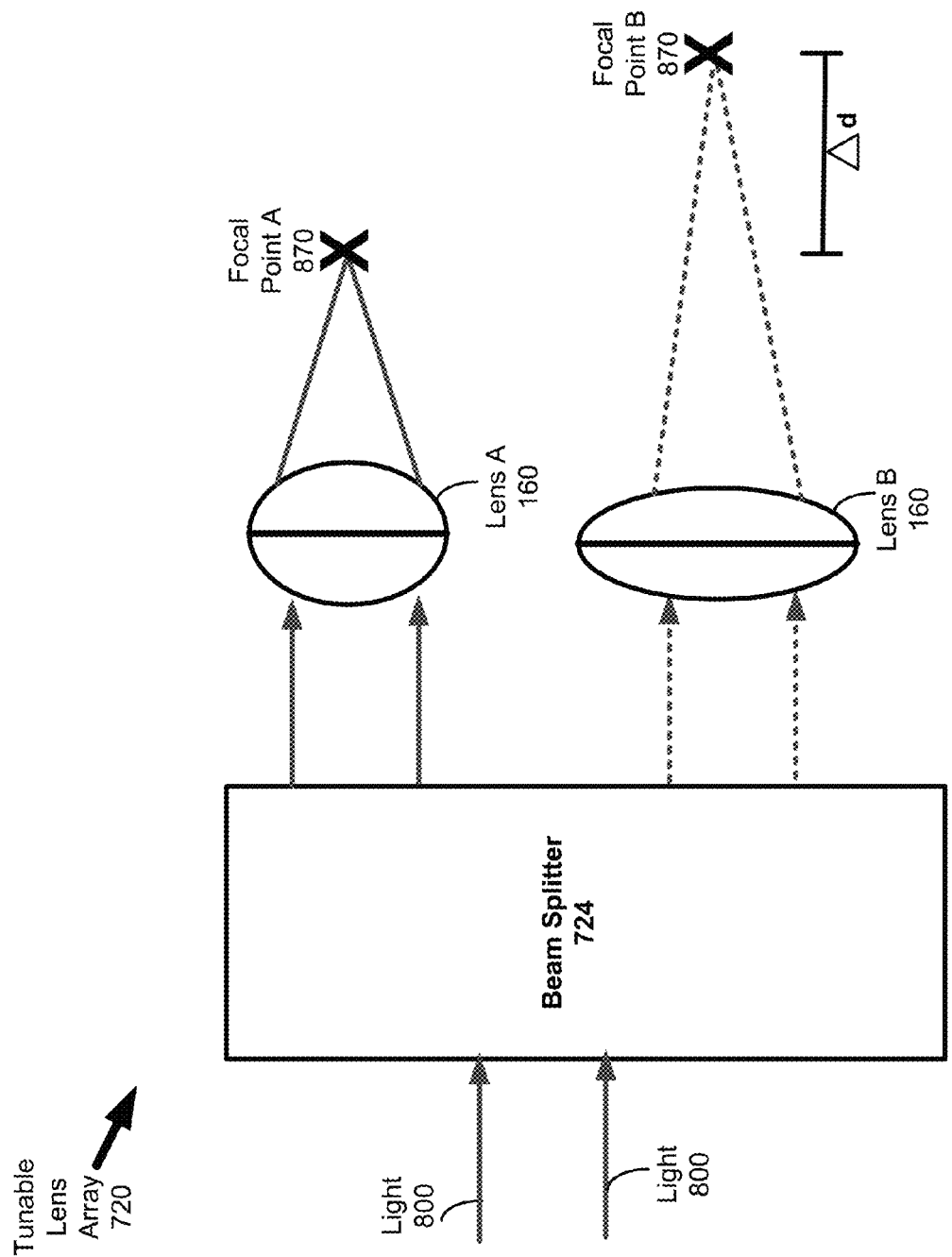
FIG. 1i is a flow chart diagram illustrating an example of method for displaying an image while using focal modulation.

As illustrated in FIG. 1j, curvature A results in light 800 passing through the tuning lens 710 having focal point A 870 while curvature B results in light 800 passing through the tuning lens 710 having focal point B 870. The tuning lens 710 is stationary, so the difference in focal lengths 871 is illustrated as Δd in the figure. FIG. 1k is a diagram illustrating the concept of a single tuning lens 710 possessing more than one potential curvature 711 which means that the lens 710 can be used to create more than one depth region 860 in a single image 880.

Examples of tuning lenses 710 illustrated in FIG. 2i include a deformable lens 712, category that includes liquid lenses 714. Tuning lenses 710 can also include liquid crystals 716.

2. Tunable Lens Array

A tuning assembly 700 can use multiple non-dynamic lenses 160 instead of one dynamically changing tuning lens 710. A splitter 724 can be used to direct light 800 to different lenses 160 with each lens 160 possessing a different curvature 711 and resulting in different focal points 870. FIG. 1l is an illustration of a tunable lens array 720.

3. Movable Lens

Figure 1M:
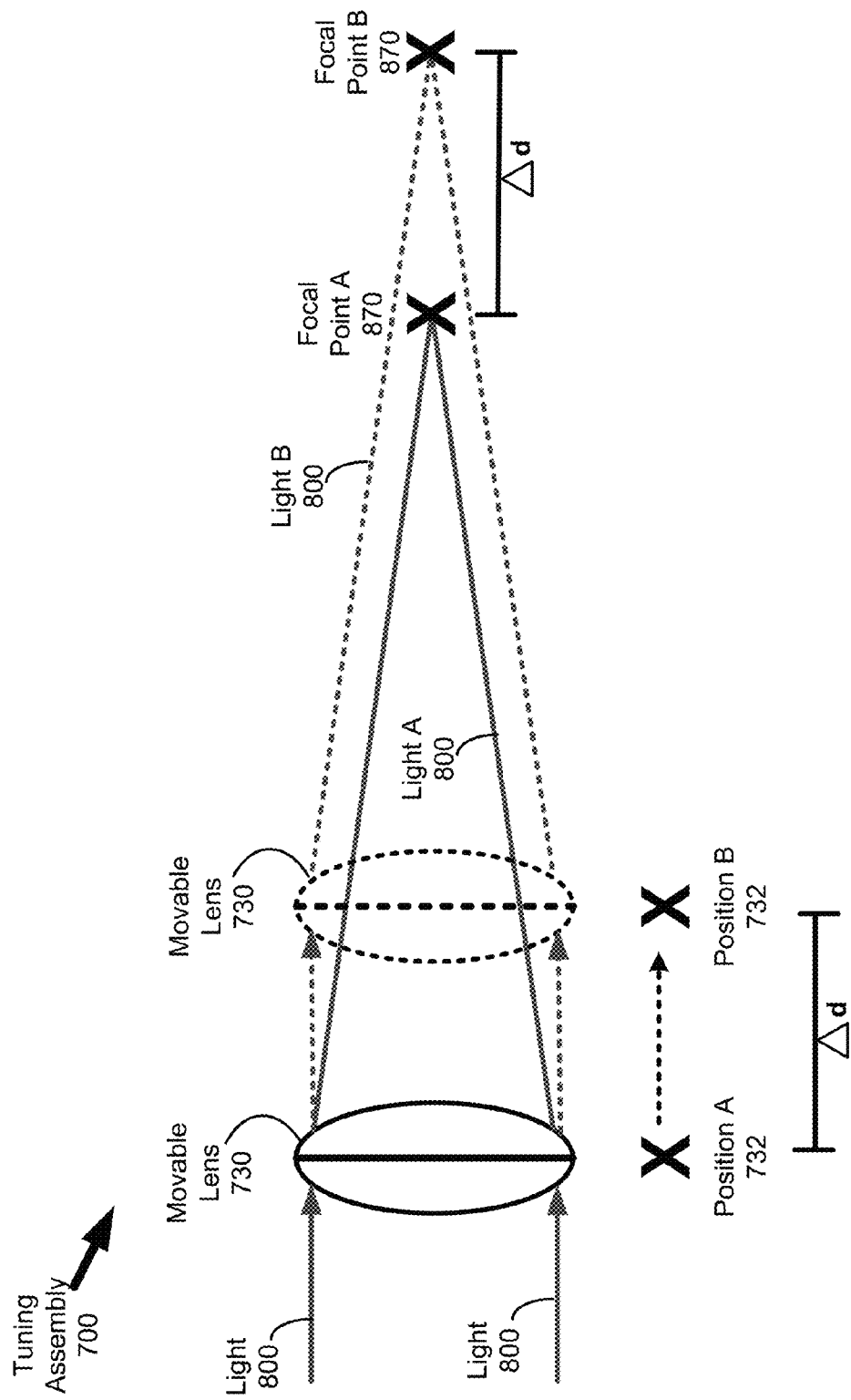
FIG. 1m is a diagram illustrating an example of a tuning assembly comprised of a movable lens.

A tuning assembly 700 can utilize a moving lens 730 to change the focal point 870 of the light 800 travelling through it. FIG. 1m is an illustration of a moving lens 730 travelling from position A 732 to position B 732, resulting in a corresponding change in the focal point 870 from focal point A 870 to focal point B 870. As illustrated in FIG. 2i, the moving lens 730 can travel on a high speed track/rail 734.

4. Deformable Mirror

As illustrated in FIG. 2i, a deformable mirror 740 can also serve as the tuning mechanism in a tuning assembly 700. A deformable mirror 740 is a mirror with a tunable radius of curvature, a mirror-alternative to a deformable lens 712.

II. Assemblies and Components

The system 100 can be described in terms of assemblies of components that perform various functions in support of the operation of the system 100. FIG. 2a is a block diagram of a system 100 comprised of an illumination assembly 200 that supplies light 800 to an imaging assembly 300. A modulator 320 of the imaging assembly 300 uses the light 800 from the illumination assembly 200 to create the image 880 that is displayed by the system 100.

As illustrated in FIG. 2b, the system 100 can also include a projection assembly 400 that directs the image 880 from the imaging assembly 300 to a location where it can be accessed by one or more users 90. The image 880 generated by the imaging assembly 300 will often be modified in certain ways before it is displayed by the system 100 to users 90, and thus the image generated by the imaging assembly 300 can also be referred to as an interim image 850 or a work-in-process image 850.

A. Illumination Assembly

An illumination assembly 200 performs the function of supplying light 800 to the system 100 so that an image 880 can be displayed. As illustrated in FIGS. 2a and 2b, the illumination assembly 200 can include a light source 210 for generating light 800. The light source 210 implements the pulsing of light 800 in accordance with the subframe sequence 854 for which the tuning assembly 700 will modify the various focal points 870 of. The illumination assembly 200 is also displayed in FIGS. 2b-2d. The illumination assembly 200 generates the light 800 that is used and processed by other assemblies of the system 100.

Figure 2F:
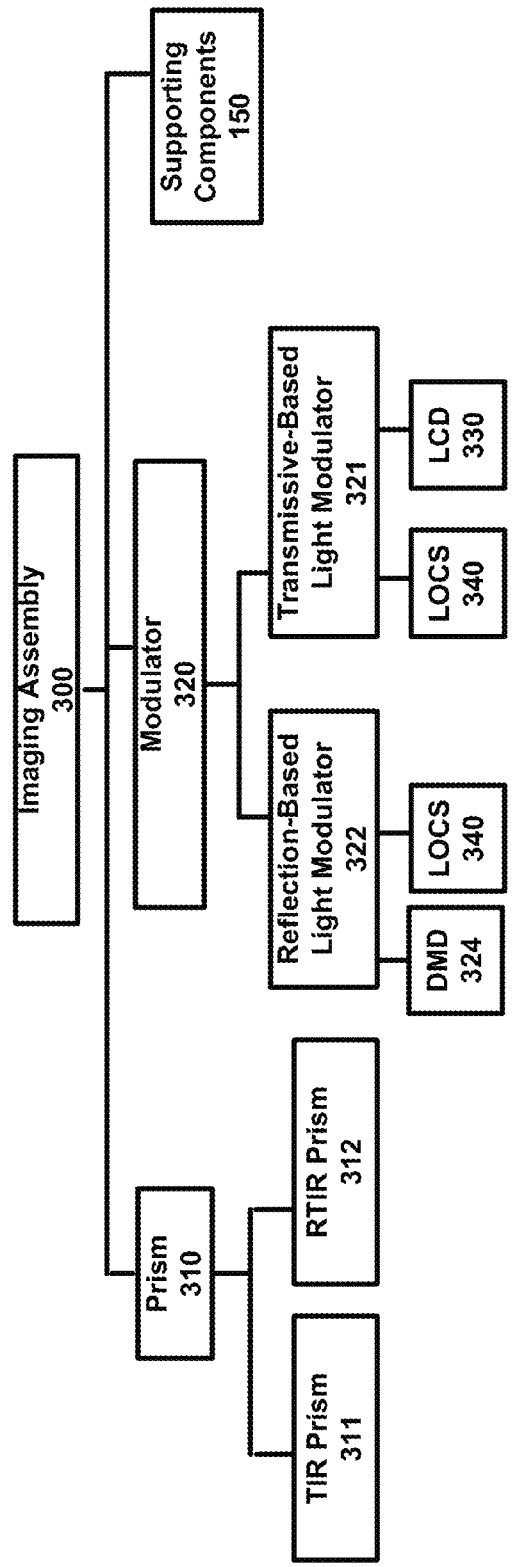
FIG. 2f is a hierarchy diagram illustrating an example of different components that can be included in an imaging assembly.

FIG. 2f is a hierarchy diagram illustrating an example of different components that can be included in the illumination assembly 200. Those components can include but are not limited a wide range of light sources 210, a diffuser assembly 280, and a variety of supporting components 150. Examples of light sources 210 can include but are such as a multi-bulb light source 211, an LED lamp 212, a 3 LED lamp 213, a laser 214, an OLED 215, a CFL 216, an incandescent lamp 218, and a non-angular dependent lamp 219. The light source 210 is where light 800 is generated and moves throughout the rest of the system 100. Thus, each light source 210 is a location 230 for the origination of light 800.

In many instances, it will be desirable to use a 3 LED lamp as a light source, which one LED designated for each primary color of red, green, and blue.

B. Imaging Assembly

An imaging assembly 300 performs the function of creating the image 880 from the light 800 supplied by the illumination assembly 200. As illustrated in FIG. 2a, a modulator 320 can transform the light 800 supplied by the illumination assembly 200 into the image 880 that is displayed by the system 100. As illustrated in FIG. 2b, the image 880 generated by the imaging assembly 300 can sometimes be referred to as an interim image 850 because the image 850 may be focused or otherwise modified to some degree before it is directed to the location where it can be experienced by one or more users 90.

Imaging assemblies 300 can vary significantly based on the type of technology used to create the image. Display technologies such as DLP (digital light processing), LCD (liquid-crystal display), LCOS (liquid crystal on silicon), and other methodologies can involve substantially different components in the imaging assembly 300.

FIG. 2f is a hierarchy diagram illustrating an example of different components that can be utilized in the imaging assembly 300 for the system 100. A prism 310 can be very useful component in directing light to and/or from the modulator 320. DLP applications will typically use an array of TIR prisms 311 or RTIR prisms 312 to direct light to and from a DMD 324.

A modulator 320 (sometimes referred to as a light modulator 320) is the device that modifies or alters the light 800, creating the image 880 that is to be displayed. Modulators 320 can operate using a variety of different attributes of the modulator 320. A reflection-based modulator 322 uses the reflective-attributes of the modulator 320 to fashion an image 880 from the supplied light 800. Examples of reflection-based modulators 322 include but are not limited to the DMD 324 of a DLP display and some LCOS (liquid crystal on silicon) panels 340. A transmissive-based modulator 321 uses the transmissive-attributes of the modulator 320 to fashion an image 880 from the supplied light 800. Examples of transmissive-based modulators 321 include but are not limited to the LCD (liquid crystal display) 330 of an LCD display and some LCOS panels 340. The imaging assembly 300 for an LCOS or LCD system 100 will typically have a combiner cube or some similar device for integrating the different one-color images into a single image 880.

The imaging assembly 300 can also include a wide variety of supporting components 150.

C. Projection Assembly

As illustrated in FIG. 2b, a projection assembly 400 can perform the task of directing the image 880 to its final destination in the system 100 where it can be accessed by users 90. In many instances, the image 880 created by the imaging assembly 300 will be modified in at least some minor ways between the creation of the image 880 by the modulator 320 and the display of the image 880 to the user 90. Thus, the image 880 generated by the modulator 320 of the imaging assembly 400 may only be an interim image 850, not the final version of the image 880 that is actually displayed to the user 90.

Figure 2G:
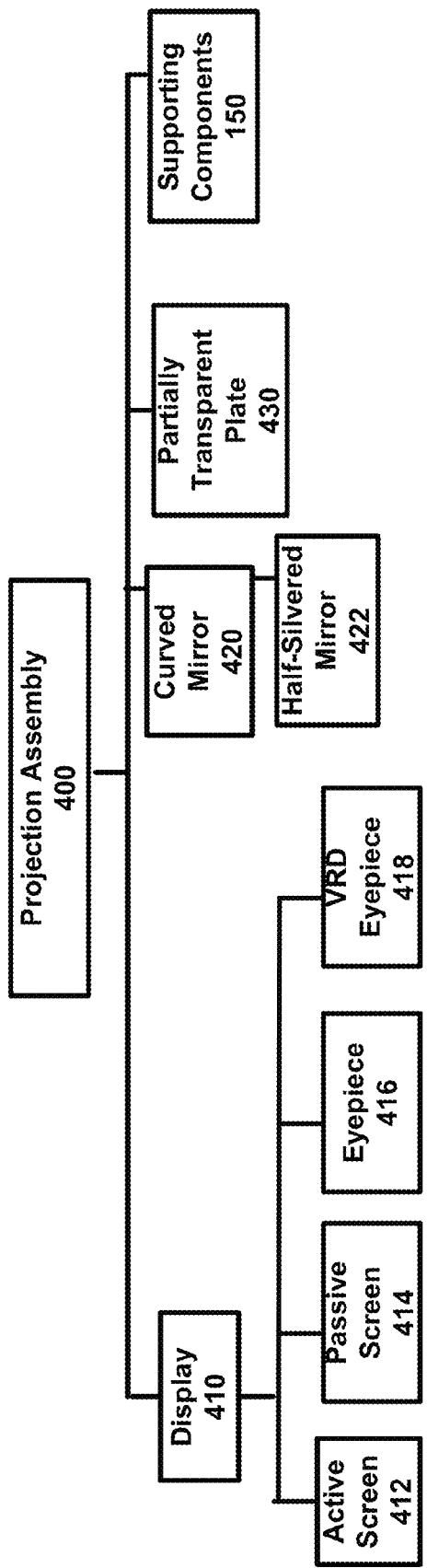
FIG. 2g is a hierarchy diagram illustrating an example of different components that can be included in a projection assembly.

FIG. 2g is a hierarchy diagram illustrating an example of different components that can be part of the projection assembly 400. A display 410 is the final destination of the image 880, i.e. the location and form of the image 880 where it can be accessed by users 90. Examples of displays 410 can include an active screen 412, a passive screen 414, an eyepiece 416, and a VRD eyepiece 418.

The projection assembly 400 can also include a variety of supporting components 150 as discussed below.

C. Sensor/Tracking Assembly

FIG. 2d illustrates an example of the system 100 that includes a tracking assembly 500 (which is also referred to as a sensor assembly 500). The sensor assembly 500 can be used to capture information about the user 90, the user's interaction with the image 880, and/or the exterior environment in which the user 90 and system 100 are physically present.

Figure 2H:
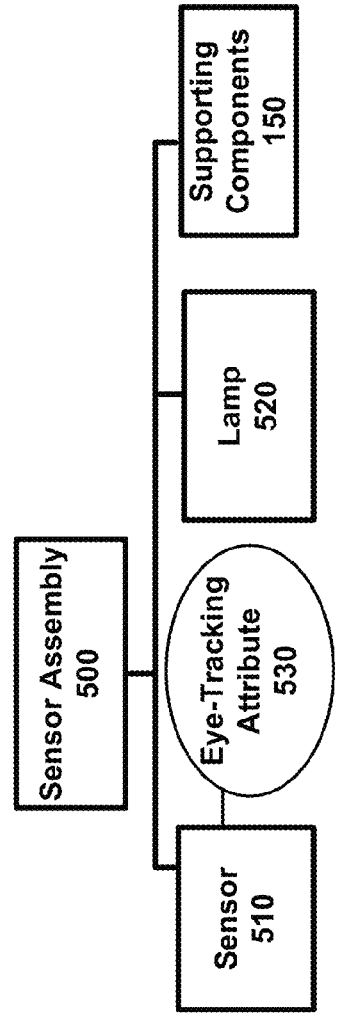
FIG. 2h is a hierarchy diagram illustrating an example of different components that can be included in the sensor assembly.
Figure 2I:
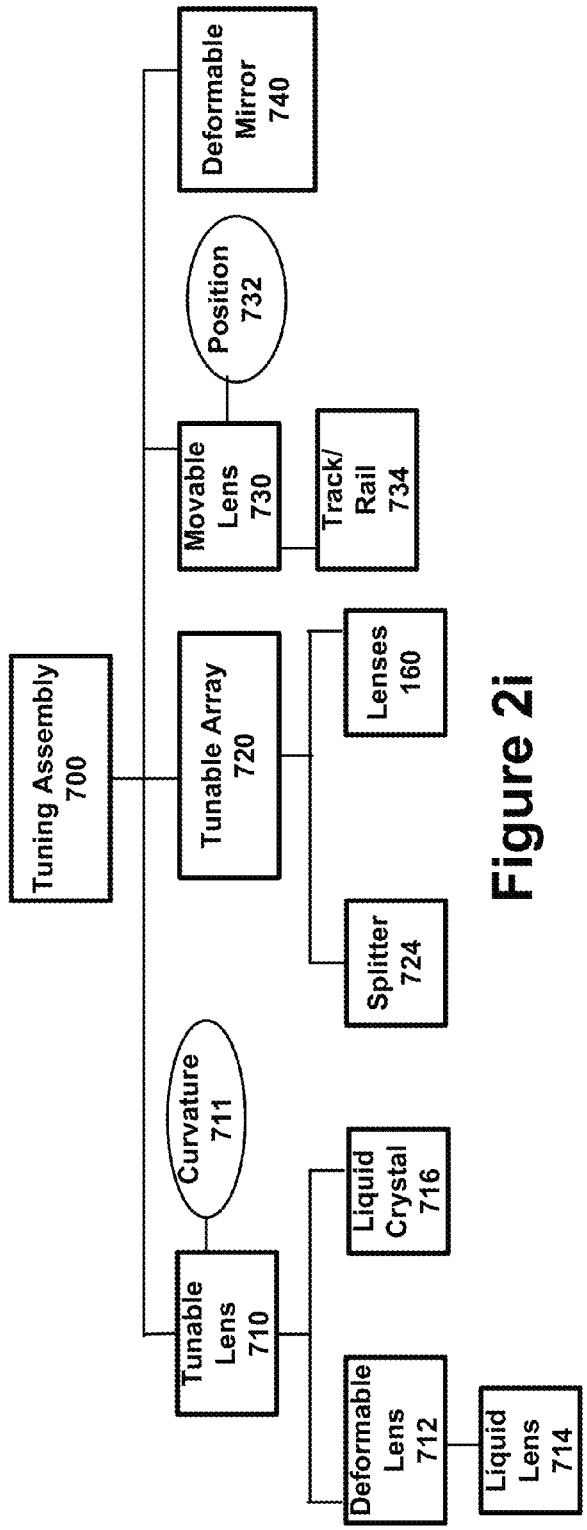
FIG. 2*i* is a hierarchy diagram illustrating an example of different components that can be included in the tuning assembly.
Figure 2J:
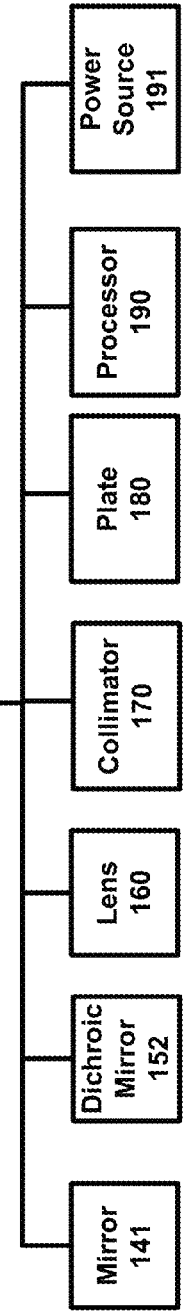
FIG. 2*j* is hierarchy diagram illustrating examples of different types of supporting components that can be included in the structure and function of the system.
Figure 2K:
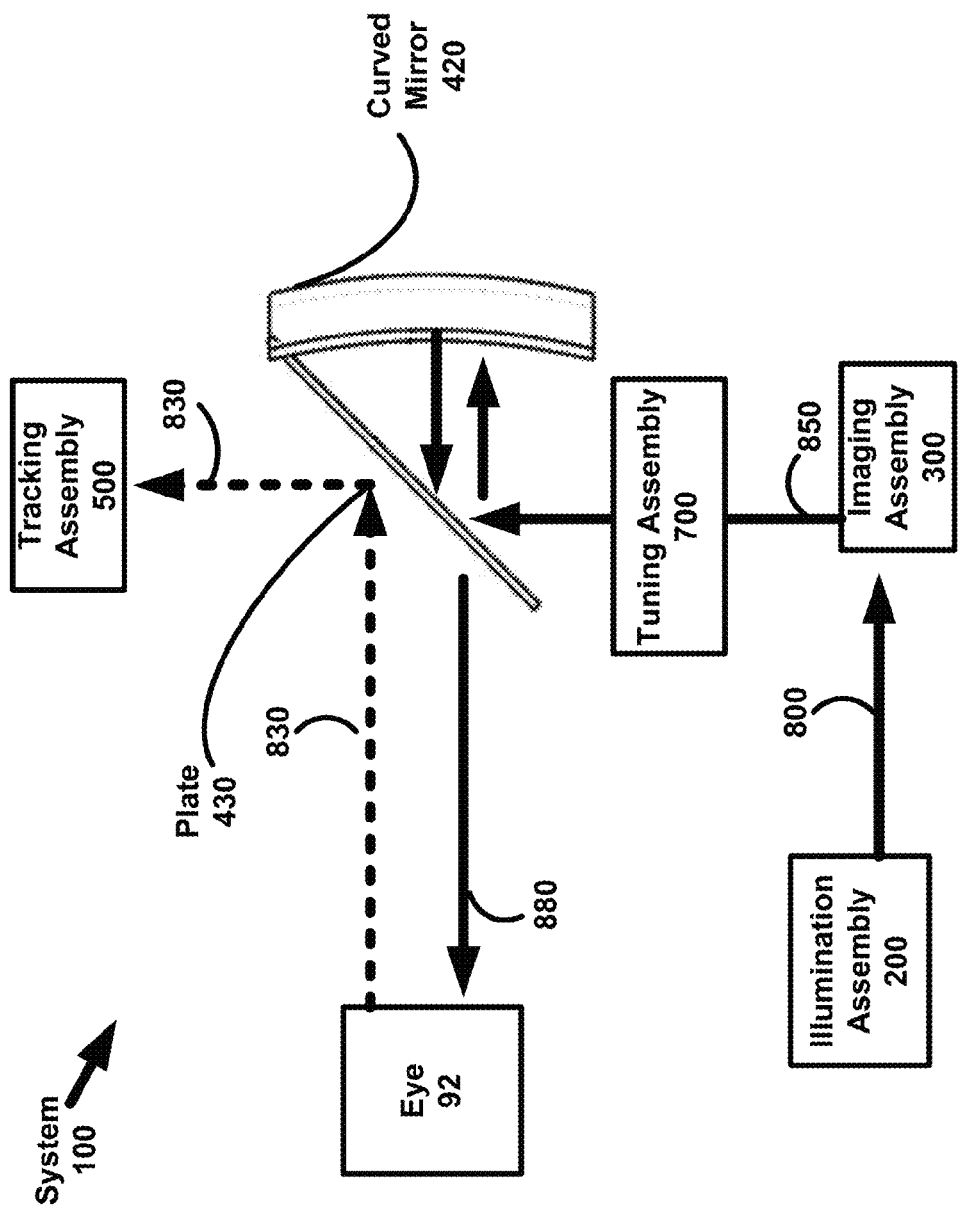
FIG. 2*k* is a block diagram illustrating an example of a system configuration that includes a curved mirror and a partially transparent plate.

As illustrated in FIG. 2h, the sensor assembly 500 can include a sensor 510, typically a camera such as an infrared camera for capturing an eye-tracking attribute 530 pertaining to eye movements of the viewer 96. A lamp 520 such as an infrared light source to support the functionality of the infrared camera, and a variety of different supporting components 150. In many embodiments of the system 100 that include a tracking assembly 500, the tracking assembly 500 will utilize components of the projection assembly 400 such as the configuration of a curved mirror 420 operating in tandem with a partially transparent plate 430. Such a configuration can be used to capture infrared images of the eye 92 of the viewer 96 while simultaneously delivering images 880 to the eye 92 of the viewer 96. FIG. 2k illustrates an example of the system 100 that includes a sensor/tracking assembly 500 that can be used to capture an eye-tracking attribute 530 that can be used to impact the focal modulation used for depth regions 860 within the image 880.

D. Tuning Assembly

FIG. 2i illustrates different components that can be incorporated into different variations of the tuning assembly 700. It is the tuning assembly 700 of the system that provides the functionality of real-time focal modulation within the context of an individual image 880. The tuning assembly 700 has a real-time capacity to modify the focal point 870 within an image 880. The illumination assembly 200 generates pulses of light 800 for each subframe 852 within the image 880 in accordance with the subframe sequence 854. For each subframe 852, the tuning assembly 700 can set the focal point 870 of the light 800.

The focal point 870 of the light 800 can be adjusted at a rate faster than the eye 92 of the viewer 96 can perceive, and that focal point 870 can accurately be driven to a given set-point within its range of operation. The tuning assembly 700 is used to change the focal point 870 of the projected image 880. Changes in the focal point 870 of the projected image 880 effectively change the distance from the eye 92 that the viewer 96 perceives the projected image 880 to be.

This can be incorporated into the system 100 in a variety of different ways, and can be particularly beneficial in a system 100 in which the image 880 is a 3D image or stereoscopic image, all of which also rely on projection of a stereoscopic image 881 (i.e. a slightly different image is projected to each eye mimicking the way that our left and right eyes see slightly different views of real world objects).

In some embodiments, the image 880 presented to a given eye is decomposed into a series of subframes 852 based on the intended distance of objects in the image 880. Then the subframes 852 are presented sequentially to the viewer while the tuning assembly 700 is used to vary the focal point 870 accordingly.

In some embodiments, the system 100 can employ a tracking assembly 500 to capture eye-tracking attributes 530 pertaining to the viewer's interactions with the image 880. An eye tracking assembly 500 can be used to determine where, within the projected image 880, the viewer 96 is looking, and correlates that to an object/region in the image 880. The system 100 can then use the tuning assembly 700 to adjust the focal point 870 of the entire projected image 880 to match the distance of the object/region that the viewer 96 is focusing on. In some embodiments, both of the approaches described above can be combined into a hybrid approach. In this technique the image 880 is decomposed based on depth regions 860, but the number and extent of each depth region 860 is based the current gaze direction and/or focus of the viewer 96.

The tuning assembly 700 can be particularly useful in presenting realistic holographic 3D images 881 (including video) to the user 90 of a near-eye display apparatus 114, such as a visor apparatus 115 or VRD visor apparatus 116. Prior art approaches to near-eye displays often suffer from a lack of realism because the focal points 870 of all objects in the displayed image are the same, regardless of whether they are intended to be close to the viewer 96 or far away from the viewer 96. This means that the entire scene is in focus, regardless of where the user 90 is looking. Background and/or foreground images can be blurred to enhance the illusion, but the viewer 96 cannot shift their focus to the blurred objects. The use of the tuning assembly 700 by the system 100 allows for the addition of various focal points 870 within the projected image 880. This means that if the viewer 96 is looking at an object, areas of the scene that are intended to appear closer or farther than that object will be out of focus, in the same way that they would when viewing a real world scene. If the user shifts their gaze to a different area of the scene they are able to bring that area into focus. The same overall effect is achieved by all three of the methods presented. The use of the tunable lens 710 or other similar focal modulating device of the tuning assembly 700 is an important because it allows the use non-coherent light sources such as LEDs and simple wave guide structures.

The tuning assembly 700 can be used with a wide variety of different modulators 320 and incorporated into DLP systems 141, LCD systems 142, LCOS systems 143, and other display technologies that are utilize micro-mirror arrays, reflective or transmissive liquid crystal displays, and other forms of modulators 320. The tuning assembly 700 can be positioned in a variety of different locations in the terms of the light pathway from light source 210 to displayed image 880. The tuning assembly 700 can be placed between the illumination source 210 and the image generator 320, between the image generator 320 and the splitter plate 430, or between the splitter plate 430 and the viewer's eye 92. Added to this configuration, the system 100 may also incorporate additional optical elements that are not shown in order to achieve correct focus and/or mitigate distortion of the images 880.

To create a 3D image, 3D depth information about the scene is required, rather than simple 2 dimensional image. In all three approaches the scene is first decomposed first based on whether the image will be presented to left or right eye (as in conventional stereoscopic 3D), each image is then decomposed a second time base on the distance within the scene from the viewer. The three approaches are further detailed below.

In this approach the scene 880 is decomposed into a number of depth regions 860. For each image 880 or frame of video a series of subframes 852 are generated. Each subframe 852 is an image of a particular depth region 860, with all other depth regions 860 removed from the scene. The subframes 852 are presented sequentially to the viewer 96. The tuning assembly 700 is used to modulate the focal point 870 of the projected images according to the depth region 860 that each represents. As an example, a scene may be decomposed into 5 depth regions, with region 1 being from 2-3 feet from the user, region 2 being from 3-5 feet from the users, region 3 being from 5-8 feet from the user, region 4 being from 8-12 feet from the user and region 5 being everything farther than 12 feet away. When the image of region 1 is presented, the tunable lens is adjusted so that image has focal distance of 2.5 ft., next the image of region 2 is presented and the focal distance is adjusted to 4 feet, and so on for each depth region. The subframes 852 are cycled at a rapid pace so that user 90 perceives a complete scene with objects at various distances.

In this approach the scene is decomposed into a number of depth regions 860. The system 100 can uses 1 or more sensors 510 from the tracking assembly 500 to track the viewer's pupils and determine where in the scene the viewer 96 is looking. The system 100 then presents a single frame 880 to the viewer 96, with the focal point 870 set to the depth region 860 of the object that the user is looking at. The projected image contains the full scene, composed off all the depth regions, but only the region 860 that the user 90 is looking in will appear in focus. The tuning assembly 700 is used to adjust the focal point 870 of the projected image 880 to the match that of the depth region 860 of focus. The eye 92 is tracked at a high rate, and the image presented to the viewer, together with the focal distance of the image are updated in real time as the viewer's focus shifts.

Alternative approaches can "factor in" eye-tracking information to dynamically determine the number and position of the depth regions used in the scene. For example if the users is looking at an object that is intended to appear 1 foot from their face, the depth regions may be broken up as 8-10 inches, 10-12 inches, 12-15 inches, 15-20 inches and >20 inches. But if the viewer is looking at an object 15 feet away, the depth regions might be broken out differently, with depth regions 860 being measured in feet, not inches. The subdivisions can be adjusted each time the viewer shifts their gaze to another object in the scene. This mimics how human beings interact with the real world at different scales of distances at different times.

E. Supporting Components

Light 800 can be a challenging resource to manage. Light 800 moves quickly and cannot be constrained in the same way that most inputs or raw materials can be. FIG. 2j is a hierarchy diagram illustrating an example of some supporting components 150, many of which are conventional optical components. Any display technology application will involve conventional optical components such as mirrors 141 (including dichroic mirrors 152) lenses 160, collimators 170, and plates 180. Similarly, any powered device requires a power source 191 and a device capable of displaying an image 880 is likely to have a processor 190.

III. Different Display Technologies

The system 100 can be implemented with respect to a wide variety of different display technologies, including but not limited to DLP.

A. DLP Embodiments

Figure 3A:
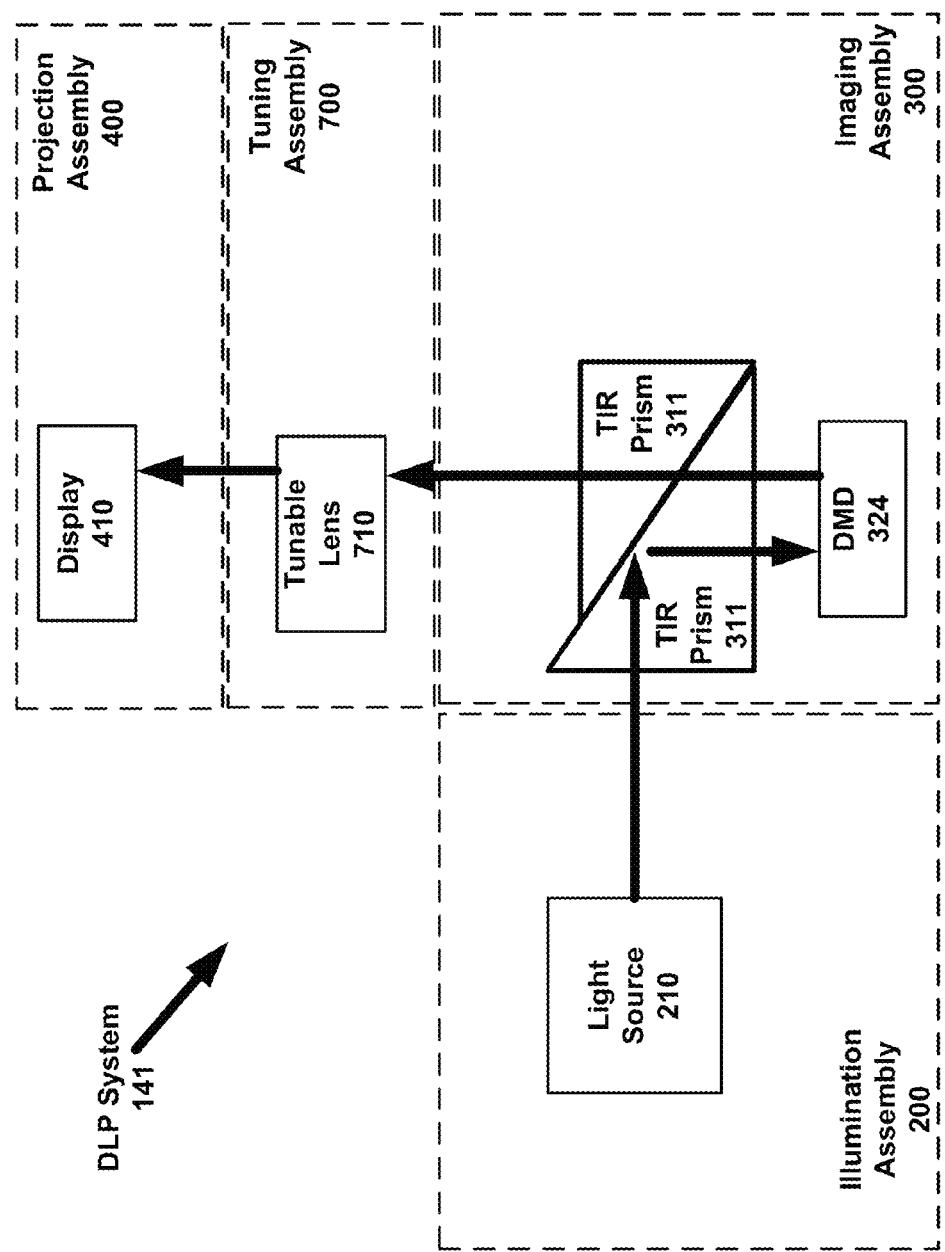
FIG. 3*a* is a block diagram illustrating an example of a DLP system that uses a tuning assembly after light is modulated into an interim image.

FIG. 3a illustrates an example of a DLP system 141, i.e. an embodiment of the system 100 that utilizes DLP optical elements. DLP systems 141 utilize a DMD 314 (digital micromirror device) comprised of millions of tiny mirrors as the modulator 320. Each micro mirror in the DMD 314 can pertain to a particular pixel in the image 880.

As discussed above, the illumination assembly 200 includes a light source 210 and multiple diffusers 282. The light 800 then passes to the imaging assembly 300. Two TIR prisms 311 direct the light 800 to the DMD 324, the DMD 324 creates an image 880 with that light 800, and the TIR prisms 311 then direct the light 800 embodying the image 880 to the display 410 where it can be enjoyed by one or more users 90.

The tuning lens 710 or other focal modifying component of the tuning assembly 700 can be positioned in a variety of different locations within the light pathway that begins with the light source 210 generating light 800 and ends with the eye 92 of the viewer 96.

Figure 3B:
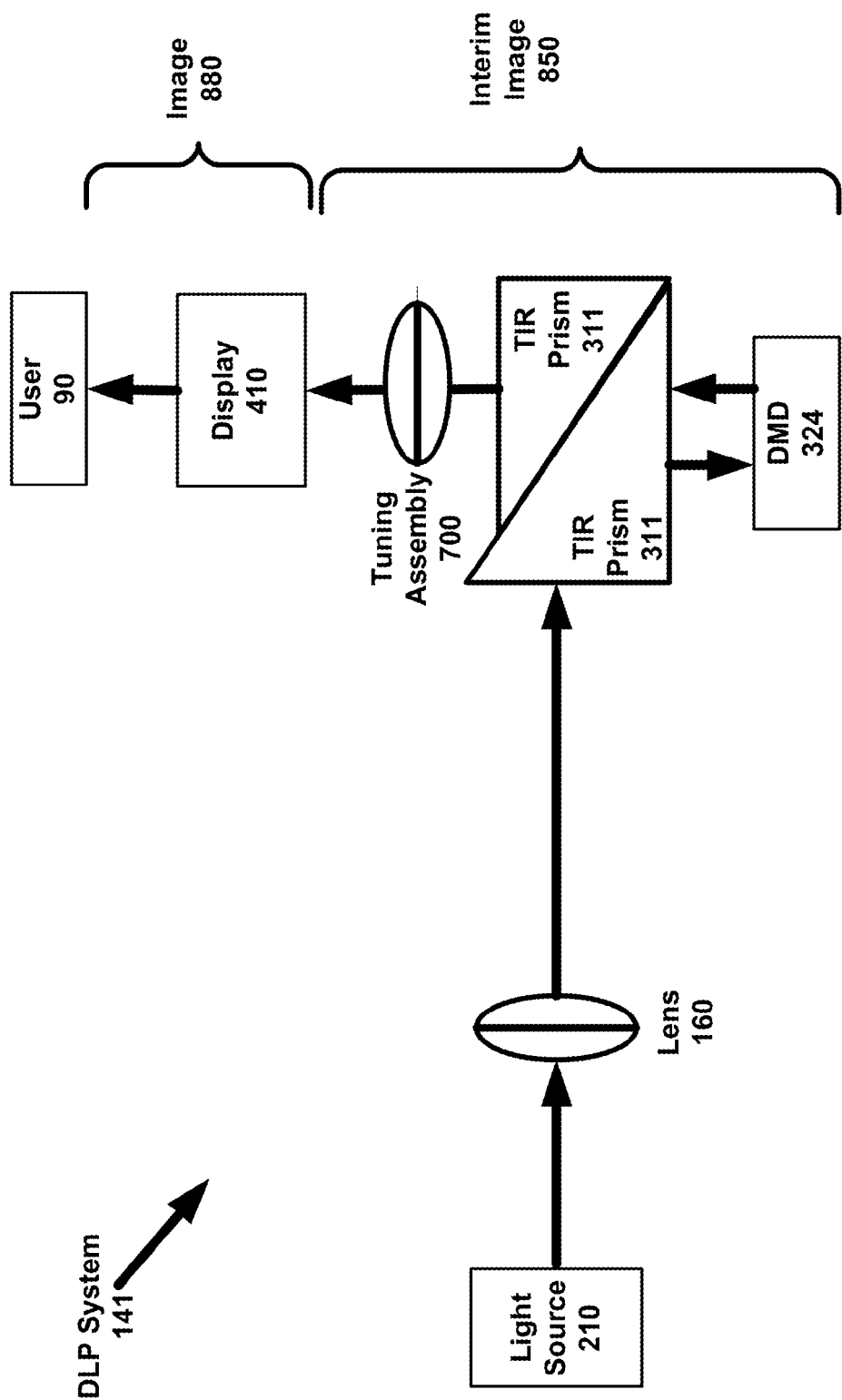
FIG. 3*b* is a block diagram illustrating a more detailed example of a DLP system.
Figure 3C:
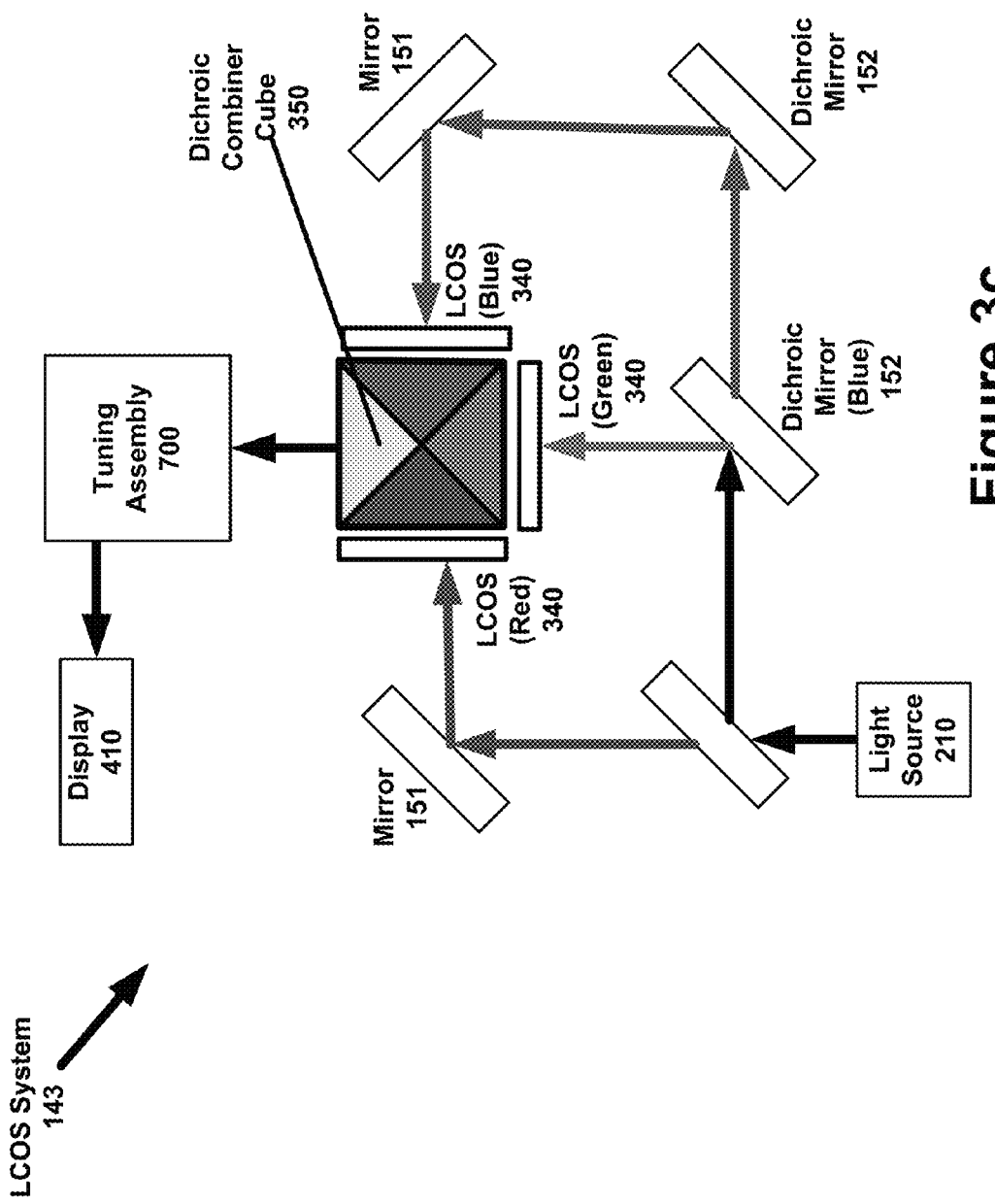
FIG. 3*c* is a block diagram illustrating an example of a LCOS system that uses a tuning assembly.

FIG. 3b is a more detailed example of a DLP system 141. The illumination assembly 200 includes one or more lenses 160, typically a condensing lens 160 and then a shaping lens 160 (not illustrated) is used to direct the light 800 to the array of TIR prisms 311. A lens 160 is positioned before the display 410 to modify/focus image 880 before providing the image 880 to the users 90. FIG. 3b also includes a more specific term for the light 800 at various stages in the process.

IV. VRD Visor Embodiments

The system 100 can be implemented in a wide variety of different configurations and scales of operation. However, the original inspiration for the conception of using subframe sequences 854 that differentiate different areas of the image 880 based on focal points 870 occurred in the context of a VRD visor system 106 embodied as a VRD visor apparatus 116. A VRD visor apparatus 116 projects the image 880 directly onto the eyes of the user 90. The VRD visor apparatus 116 is a device that can be worn on the head of the user 90. In many embodiments, the VRD visor apparatus 116 can include sound as well as visual capabilities. Such embodiments can include multiple modes of operation, such as visual only, audio only, and audio-visual modes. When used in a non-visual mode, the VRD apparatus 116 can be configured to look like ordinary headphones.

Figure 4B:
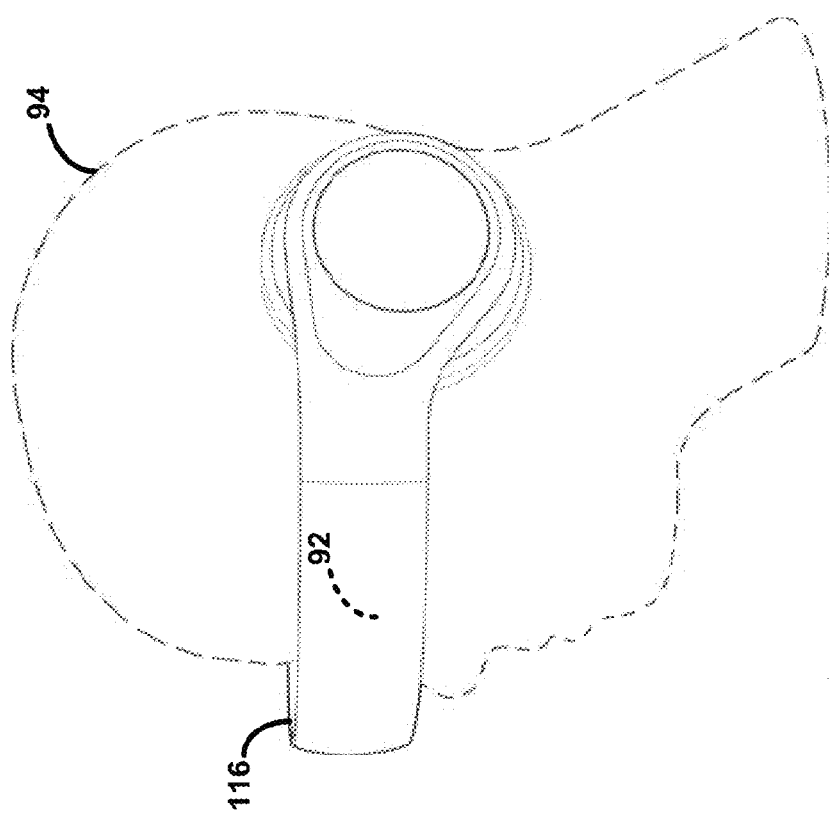
FIG. 4*b* is environmental diagram illustrating an example of a side view of a user wearing a VRD apparatus embodying the system.
Figure 4A:
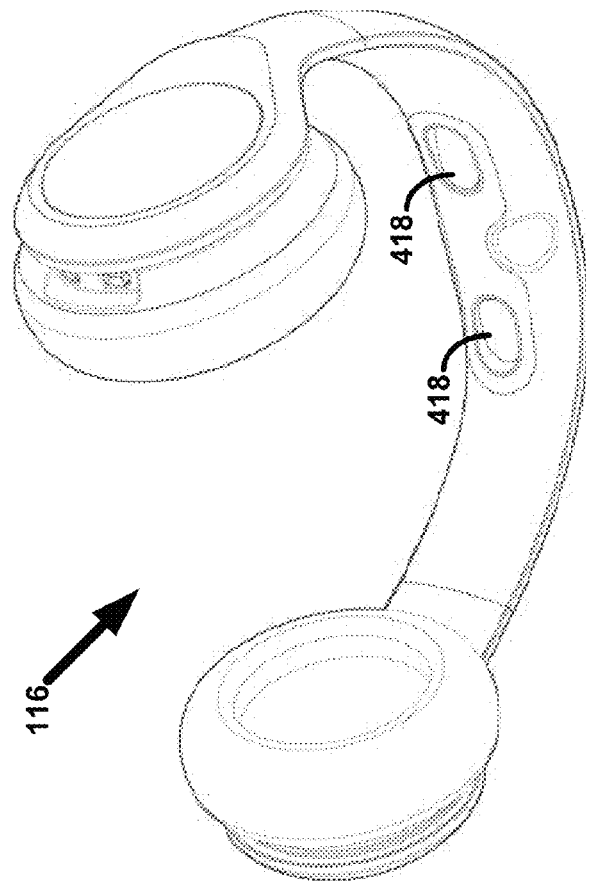
FIG. 4*a* is diagram of a perspective view of a VRD apparatus embodiment of the system.

FIG. 4a is a perspective diagram illustrating an example of a VRD visor apparatus 116. Two VRD eyepieces 418 provide for directly projecting the image 880 onto the eyes of the user 90.

FIG. 4b is a side view diagram illustrating an example of a VRD visor apparatus 116 being worn on the head 94 of a user 90. The eyes 92 of the user 90 are blocked by the apparatus 116 itself, with the apparatus 116 in a position to project the image 880 on the eyes 92 of the user 90.

Figure 4C:
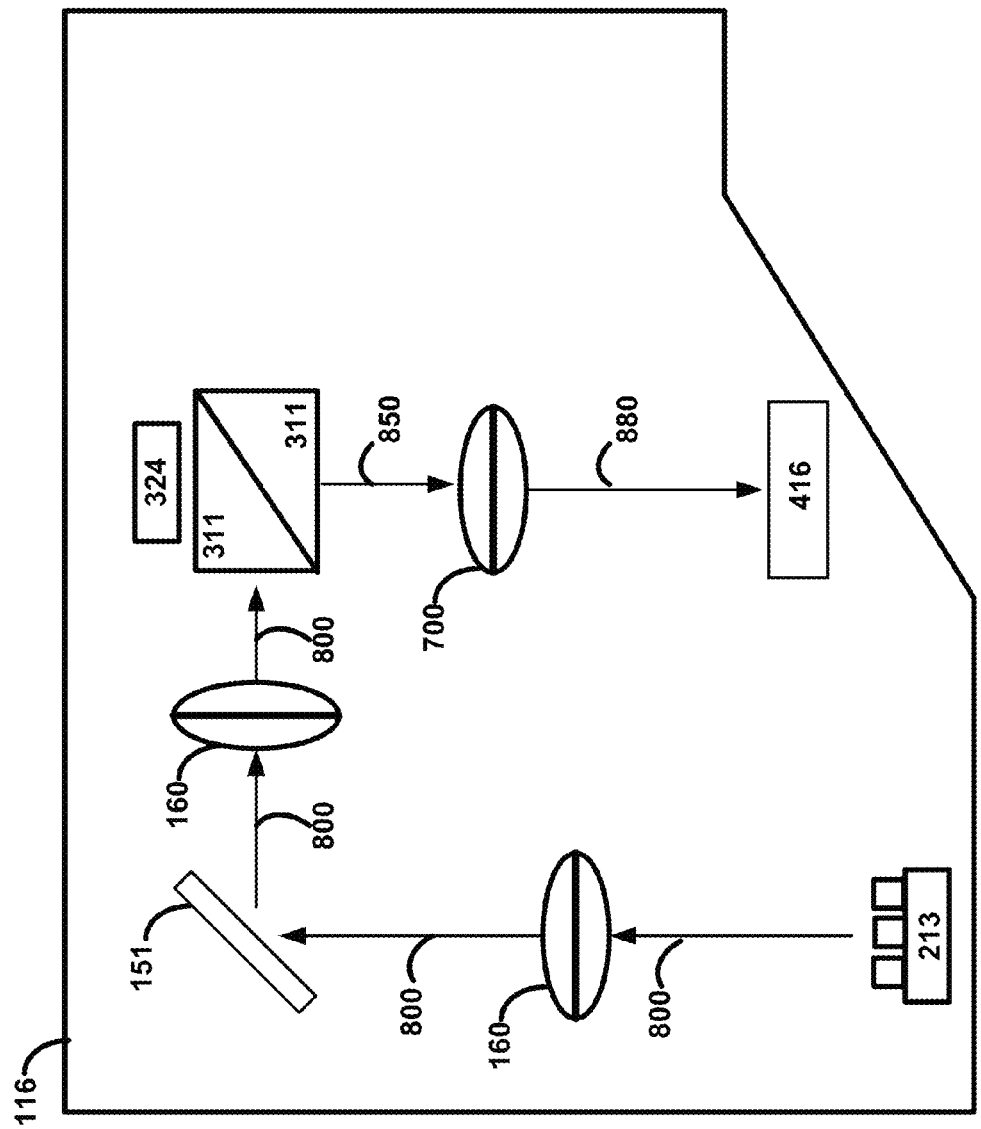
FIG. 4*c* is a configuration diagram illustrating an example of the components that can be used in a VRD apparatus.

FIG. 4c is a component diagram illustrating an example of a VRD visor apparatus 116 for the left eye 92. A mirror image of FIG. 4c would pertain to the right eye 92.

A 3 LED light source 213 generates the light which passes through a condensing lens 160 that directs the light 800 to a mirror 151 which reflects the light 800 to a shaping lens 160 prior to the entry of the light 800 into an imaging assembly 300 comprised of two TIR prisms 311 and a DMD 324. The interim image 850 from the imaging assembly 300 passes through another lens 160 that focuses the interim image 850 into a final image 880 that is viewable to the user 90 through the eyepiece 416. The tuning assembly 700 is used in conjunction with the subframe sequence 854 to change the focal points 870 of light 800 on a depth region 860 by depth region 860 basis before the viewer 96 has access to the image 880.

V. Alternative Embodiments

No patent application can expressly disclose in words or in drawings, all of the potential embodiments of an invention. Variations of known equivalents are implicitly included. In accordance with the provisions of the patent statutes, the principles, functions, and modes of operation of the systems 100, methods 900, and apparatuses 110 (collectively the "system" 100) are explained and illustrated in certain preferred embodiments. However, it must be understood that the inventive systems 100 may be practiced otherwise than is specifically explained and illustrated without departing from its spirit or scope.

The description of the system 100 provided above and below should be understood to include all novel and non-obvious alternative combinations of the elements described herein, and claims may be presented in this or a later application to any novel non-obvious combination of these elements. Moreover, the foregoing embodiments are illustrative, and no single feature or element is essential to all possible combinations that may be claimed in this or a later application.

The system 100 represents a substantial improvement over prior art display technologies. Just as there are a wide range of prior art display technologies, the system 100 can be similarly implemented in a wide range of different ways. The innovation of altering the subframe illumination sequence 854 within a particular frame 882 can be implemented at a variety of different scales, utilizing a variety of different display technologies, in both immersive and augmenting contexts, and in both one-way (no sensor feedback from the user 90) and two-way (sensor feedback from the user 90) embodiments.

A. Variations of Scale

Display devices can be implemented in a wide variety of different scales. The monster scoreboard at EverBanks Field (home of the Jacksonville Jaguars) is a display system that is 60 feet high, 362 feet long, and comprised of 35.5 million LED bulbs. The scoreboard is intended to be viewed simultaneously by tens of thousands of people. At the other end of the spectrum, the GLYPH™ visor by Avegant Corporation is a device that is worn on the head of a user and projects visual images directly in the eyes of a single viewer. Between those edges of the continuum are a wide variety of different display systems.

The system 100 displays visual images 808 to users 90 with enhanced light with reduced coherence. The system 100 can be potentially implemented in a wide variety of different scales.

Figure 5A:
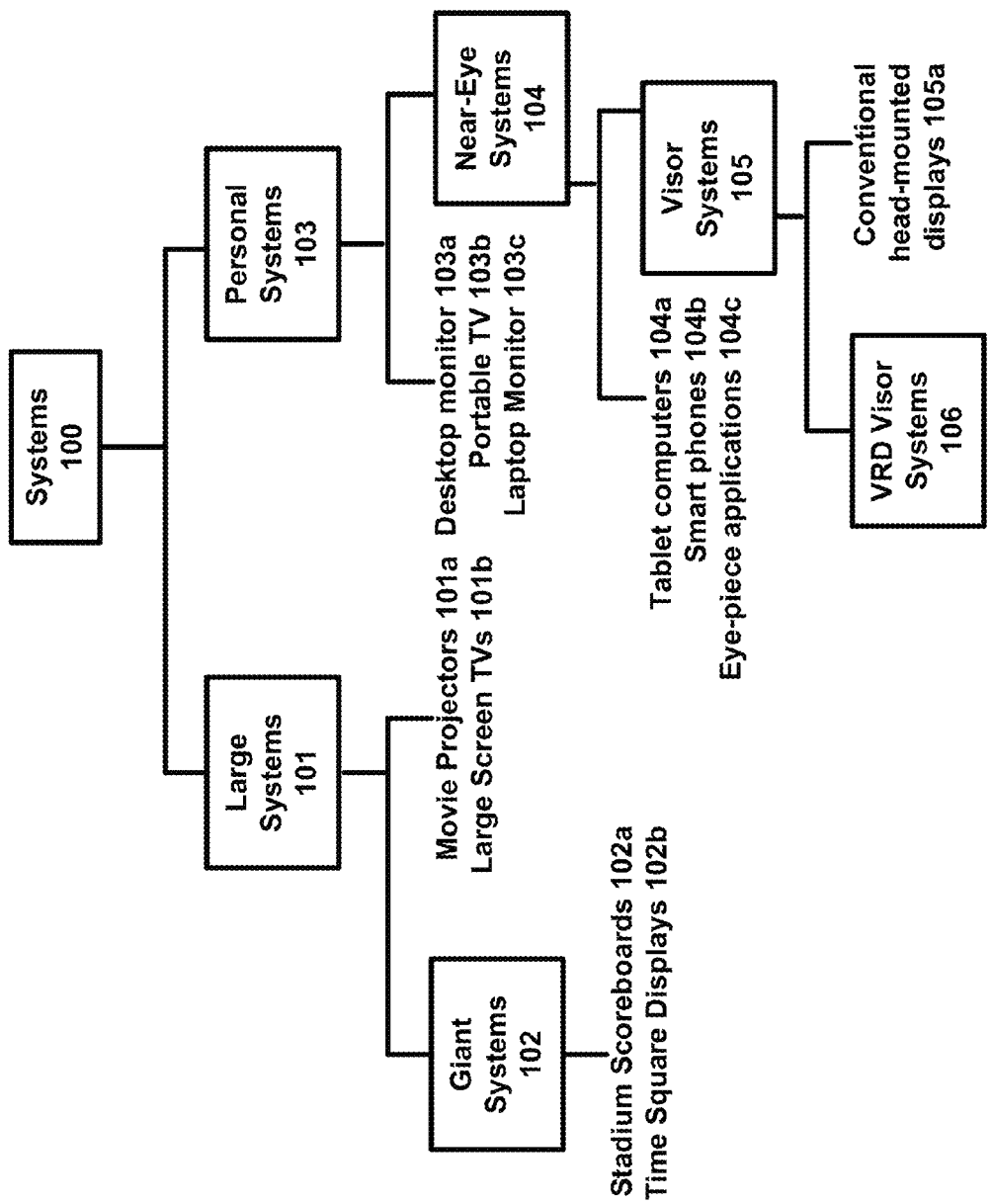
FIG. 5*a* is a hierarchy diagram illustrating an example of the different categories of display systems that the innovative system can be potentially be implemented in, ranging from giant systems such as stadium scoreboards to VRD visor systems that project visual images directly on the retina of an individual user.

FIG. 5a is a hierarchy diagram illustrating various categories and subcategories pertaining to the scale of implementation for display systems generally, and the system 100 specifically. As illustrated in FIG. 5a, the system 100 can be implemented as a large system 101 or a personal system 103

1. Large Systems

A large system 101 is intended for use by more than one simultaneous user 90. Examples of large systems 101 include movie theater projectors, large screen TVs in a bar, restaurant, or household, and other similar displays. Large systems 101 include a subcategory of giant systems 102, such as stadium scoreboards 102a, the Time Square displays 102b, or other or the large outdoor displays such as billboards off the expressway.

2. Personal Systems

A personal system 103 is an embodiment of the system 100 that is designed to for viewing by a single user 90. Examples of personal systems 103 include desktop monitors 103a, portable TVs 103b, laptop monitors 103c, and other similar devices. The category of personal systems 103 also includes the subcategory of near-eye systems 104.

a. Near-Eye Systems

A near-eye system 104 is a subcategory of personal systems 103 where the eyes of the user 90 are within about 12 inches of the display. Near-eye systems 104 include tablet computers 104a, smart phones 104b, and eye-piece applications 104c such as cameras, microscopes, and other similar devices. The subcategory of near-eye systems 104 includes a subcategory of visor systems 105.

b. Visor Systems

A visor system 105 is a subcategory of near-eye systems 104 where the portion of the system 100 that displays the visual image 200 is actually worn on the head 94 of the user 90. Examples of such systems 105 include virtual reality visors, Google Glass, and other conventional head-mounted displays 105a. The category of visor systems 105 includes the subcategory of VRD visor systems 106.

c. VRD Visor Systems

A VRD visor system 106 is an implementation of a visor system 105 where visual images 200 are projected directly on the eyes of the user. The technology of projecting images directly on the eyes of the viewer is disclosed in a published patent application titled "IMAGE GENERATION SYSTEMS AND IMAGE GENERATING METHODS" (U.S. Ser. No. 13/367,261) that was filed on Feb. 6, 2012, the contents of which are hereby incorporated by reference. It is anticipated that a VRD visor system 106 is particularly well suited for the implementation of the multiple diffuser 140 approach for reducing the coherence of light 210.

3. Integrated Apparatus

Figure 5B:
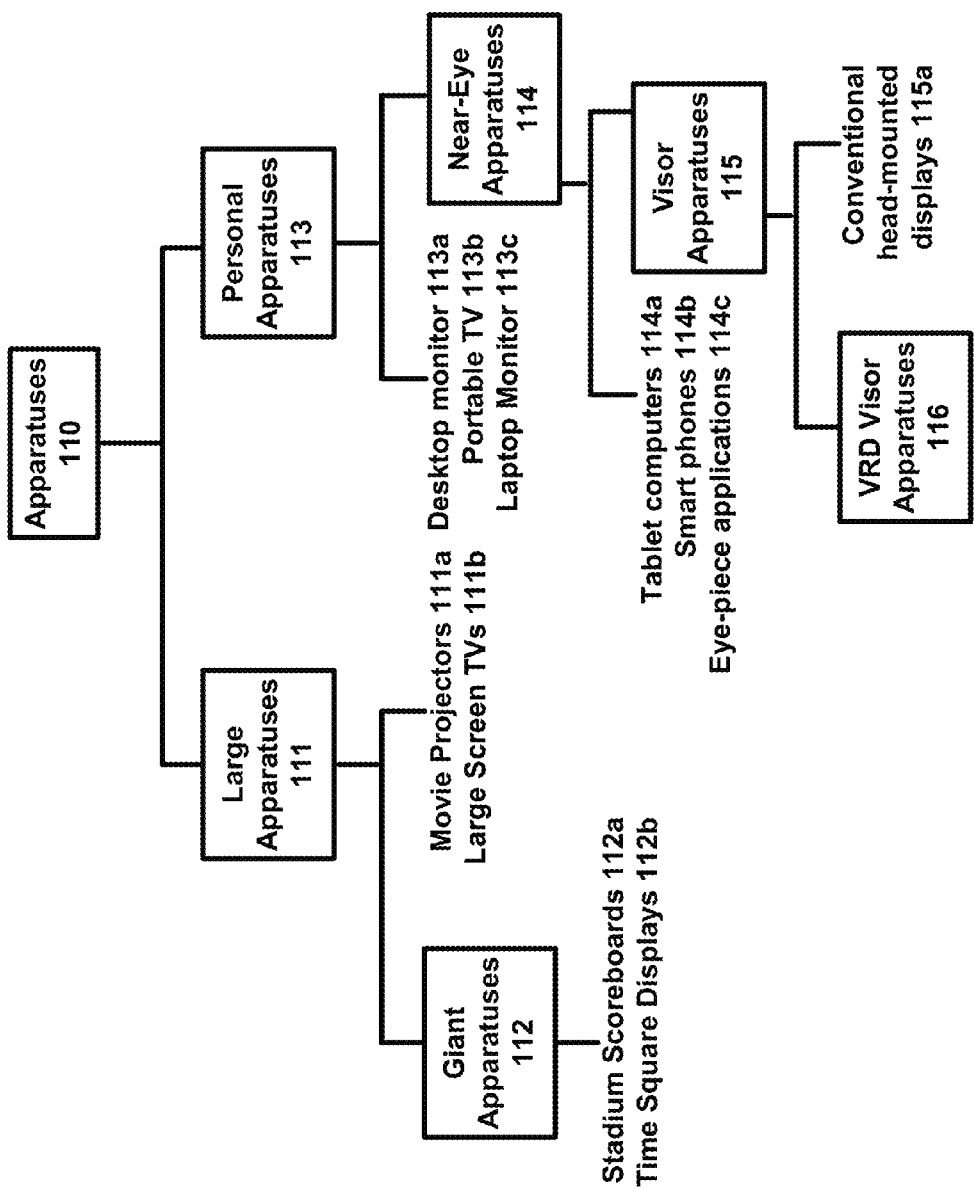
FIG. 5*b* is a hierarchy diagram illustrating an example of different categories of display apparatuses that close mirrors the systems of FIG. 5*a*.

Media components tend to become compartmentalized and commoditized over time. It is possible to envision display devices where an illumination assembly 120 is only temporarily connected to a particular imaging assembly 160. However, in most embodiments, the illumination assembly 120 and the imaging assembly 160 of the system 100 will be permanently (at least from the practical standpoint of users 90) into a single integrated apparatus 110. FIG. 5b is a hierarchy diagram illustrating an example of different categories and subcategories of apparatuses 110. FIG. 5b closely mirrors FIG. 5a. The universe of potential apparatuses 110 includes the categories of large apparatuses 111 and personal apparatuses 113. Large apparatuses 111 include the subcategory of giant apparatuses 112. The category of personal apparatuses 113 includes the subcategory of near-eye apparatuses 114 which includes the subcategory of visor apparatuses 115. VRD visor apparatuses 116 comprise a category of visor apparatuses 115 that implement virtual retinal displays, i.e. they project visual images 200 directly into the eyes of the user 90.

Figure 5C:
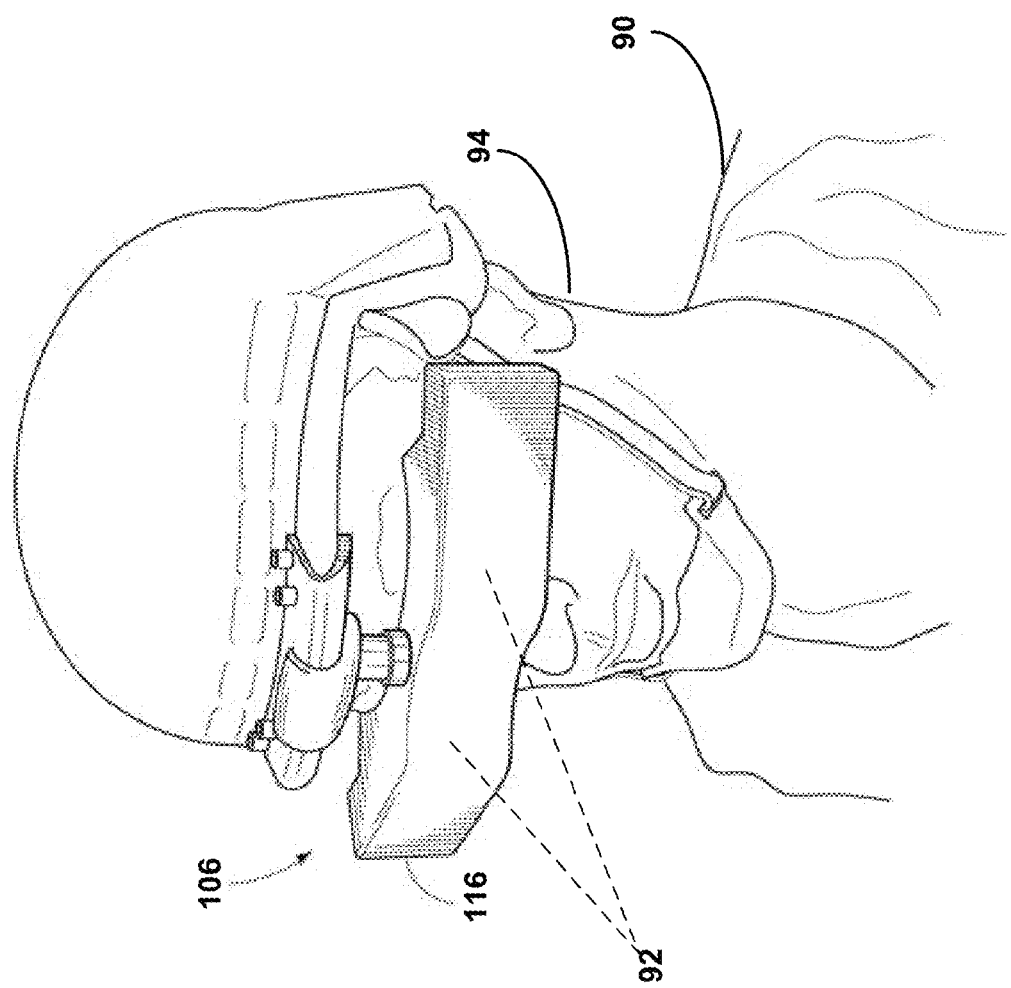
FIG. 5*c* is a perspective view diagram illustrating an example of user wearing a VRD visor apparatus.

FIG. 5c is a diagram illustrating an example of a perspective view of a VRD visor system 106 embodied in the form of an integrated VRD visor apparatus 116 that is worn on the head 94 of the user 90. Dotted lines are used with respect to element 92 because the eyes 92 of the user 90 are blocked by the apparatus 116 itself in the illustration.

B. Different Categories of Display Technology

The prior art includes a variety of different display technologies, including but not limited to DLP (digital light processing), LCD (liquid crystal displays), and LCOS (liquid crystal on silicon). FIG. 5d, which is a hierarchy diagram illustrating different categories of the system 100 based on the underlying display technology in which the system 200 can be implemented. The system 100 is intended for use as a DLP system 141, but could be potentially be used as an LCOS system 143 or even an LCD system 142 although the means of implementation would obviously differ and the reasons for implementation may not exist. The system 100 can also be implemented in other categories and subcategories of display technologies.

C. Immersion Vs. Augmentation

FIG. 5e is a hierarchy diagram illustrating a hierarchy of systems 100 organized into categories based on the distinction between immersion and augmentation. Some embodiments of the system 100 can have a variety of different operating modes 120. An immersion mode 121 has the function of blocking out the outside world so that the user 90 is focused exclusively on what the system 100 displays to the user 90. In contrast, an augmentation mode 122 is intended to display visual images 200 that are superimposed over the physical environment of the user 90. The distinction between immersion and augmentation modes of the system 100 is particularly relevant in the context of near-eye systems 104 and visor systems 105.

Some embodiments of the system 100 can be configured to operate either in immersion mode or augmentation mode, at the discretion of the user 90. While other embodiments of the system 100 may possess only a single operating mode 120.

D. Display Only Vs. Display/Detect/Track/Monitor

Some embodiments of the system 100 will be configured only for a one-way transmission of optical information. Other embodiments can provide for capturing information from the user 90 as visual images 880 and potentially other aspects of a media experience are made accessible to the user 90. FIG. 1f is a hierarchy diagram that reflects the categories of a one-way system 124 (a non-sensing operating mode 124) and a two-way system 123 (a sensing operating mode 123). A two-way system 123 can include functionality such as retina scanning and monitoring. Users 90 can be identified, the focal point of the eyes 92 of the user 90 can potentially be tracked, and other similar functionality can be provided. In a one-way system 124, there is no sensor or array of sensors capturing information about or from the user 90.

E. Media Players—Integrated Vs. Separate

Display devices are sometimes integrated with a media player. In other instances, a media player is totally separate from the display device. By way of example, a laptop computer can include in a single integrated device, a screen for displaying a movie, speakers for projecting the sound that accompanies the video images, a DVD or BLU-RAY player for playing the source media off a disk. Such a device is also capable of streaming FIG. 5g is a hierarchy diagram illustrating a variety of different categories of systems 100 based on the whether the system 100 is integrated with a media player or not. An integrated media player system 107 includes the capability of actually playing media content as well as displaying the image 880. A non-integrated media player system 108 must communicate with a media player in order to play media content.

F. Users—Viewers Vs. Operators

FIG. 5h is a hierarchy diagram illustrating an example of different roles that a user 90 can have. A viewer 96 can access the image 880 but is not otherwise able to control the functionality of the system 100. An operator 98 can control the operations of the system 100, but cannot access the image 880. In a movie theater, the viewers 96 are the patrons and the operator 98 is the employee of the theater.

G. Attributes of Media Content

Figure 5I:
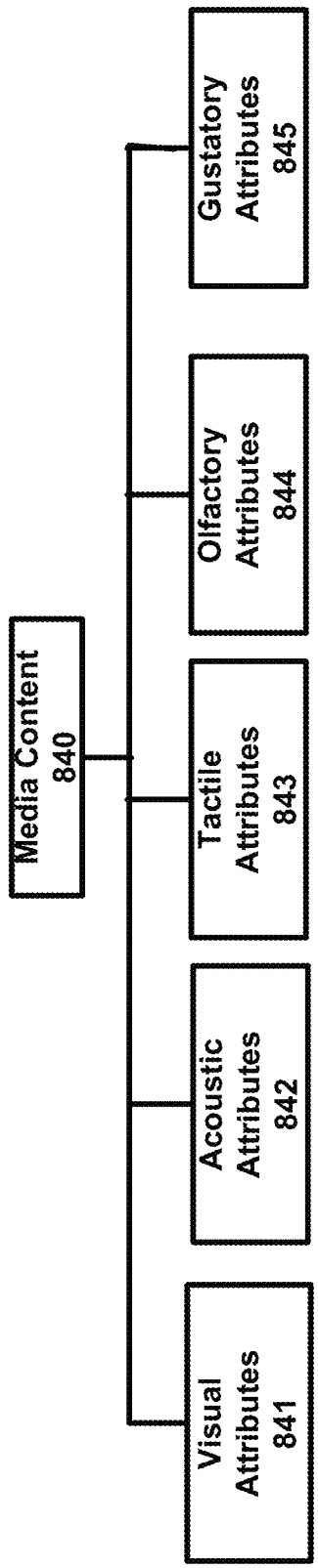
FIG. 5*i* is a hierarchy diagram illustrating an example of different attributes that can be associated with media content.

As illustrated in FIG. 5i, media content 840 can include a wide variety of different types of attributes. A system 100 for displaying an image 880 is a system 100 that plays media content 840 with a visual attribute 841. However, many instances of media content 840 will also include an acoustic attribute 842 or even a tactile attribute. Some new technologies exist for the communication of olfactory attributes 844 and it is only a matter of time before the ability to transmit gustatory attributes 845 also become part of a media experience in certain contexts.

Figure 5J:
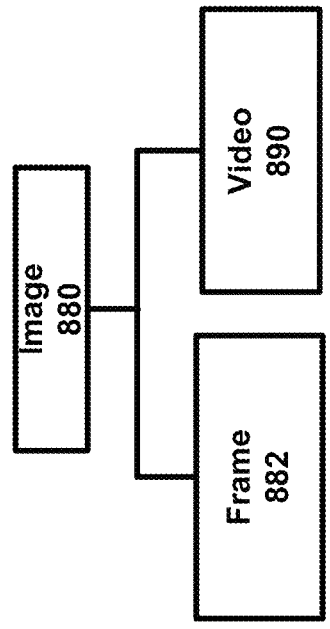
FIG. 5*j* is a hierarchy diagram illustrating examples of different contexts of images.

As illustrated in FIG. 5j, some images 880 are parts of a larger video 890 context. In other contexts, an image 880 can be stand-alone still frame 882.

VI. Glossary/Definitions

Table 1 below sets forth a list of element numbers, names, and descriptions/definitions.

| # | Name | Definition/Description |
|---|---|---|
| 90 | User | A user 90 is a viewer 96 and/or operator 98 of the system 100. The user 90 is typically a human being. In alternative embodiments, users 90 can be different organisms such as dogs or cats, or even automated technologies such as expert systems, artificial intelligence applications, and other similar "entities". |
| 92 | Eye | An organ of the user 90 that provides for the sense of sight. The eye consists of different portions including but not limited to the sclera, iris, cornea, pupil, and retina. Some embodiments of the system 100 involve a VRD visor apparatus 116 that can project the desired image 880 directly onto the eye 92 of the user 90. |
| 94 | Head | The portion of the body of the user 90 that includes the eye 92. Some embodiments of the system 100 can involve a visor apparatus 115 that is worn on the head 94 of the user 90. |
| 96 | Viewer | A user 90 of the system 100 who views the image 880 provided by the system 100. All viewers 96 are users 90 but not all users 90 are viewers 96. The viewer 96 does not necessarily control or operate the system 100. The viewer 96 can be a passive beneficiary of the system 100, such as a patron at a movie theater who is not responsible for the operation of the projector or someone wearing a visor apparatus 115 that is controlled by someone else. |

-continued

| # | Name | Definition/Description |
|---|---|---|
| 98 | Operator | A user 90 of the system 100 who exerts control over the processing of the system 100. All operators 98 are users 90 but not all users 90 are operators 98. The operator 98 does not necessarily view the images 880 displayed by the system 100 because the operator 98 may be someone operating the system 100 for the benefit of others who are viewers 96. For example, the operator 98 of the system 100 may be someone such as a projectionist at a movie theater or the individual controlling the system 100. |
| 100 | System | A collective configuration of assemblies, subassemblies, components, processes, and/or data that provide a user 90 with the functionality of engaging in a media experience such as viewing an image 890. Some embodiments of the system 100 can involve a single integrated apparatus 110 hosting all components of the system 100 while other embodiments of the system 100 can involve different non-integrated device configurations. Some embodiments of the system 100 can be large systems 102 or even giant system 101 while other embodiments of the system 100 can be personal systems 103, such as near-eye systems 104, visor systems 105, and VRD visor systems 106. Systems 100 can also be referred to as display systems 100. |
| 101 | Giant System | An embodiment of the system 100 intended to be viewed simultaneously by a thousand or more people. Examples of giant systems 101 include scoreboards at large stadiums, electronic billboards such the displays in Time Square in New York City, and other similar displays. A giant system 101 is a subcategory of large systems 102. |
| 102 | Large System | An embodiment of the system 100 that is intended to display an image 880 to multiple users 90 at the same time. A large system 102 is not a personal system 103. The media experience provided by a large system 102 is intended to be shared by a roomful of viewers 96 using the same illumination assembly 200, imaging assembly 300, and projection assembly 400. Examples of large systems 102 include but are not limited to a projector/screen configuration in a movie theater, classroom, or conference room; television sets in sports bar, airport, or residence; and scoreboard displays at a stadium. Large systems 101 can also be referred to as large display systems 101. |
| 103 | Personal System | A category of embodiments of the system 100 where the media experience is personal to an individual viewer 96. Common examples of personal media systems include desktop computers (often referred to as personal computers), laptop computers, portable televisions, and near-eye systems 104. Personal systems 103 can also be referred to as personal media systems 103. Near-eye systems 104 are a subcategory of personal systems 103. |
| 104 | Near-Eye System | A category of personal systems 103 where the media experience is communicated to the viewer 96 at a distance that is less than or equal to about 12 inches (30.48 cm) away. Examples of near-eye systems 103 include but are not limited to tablet computers, smart phones, system 100 involving eyepieces, such as cameras, telescopes, microscopes, etc., and visor media systems 105,. Near-eye systems 104 can also be referred to as near-eye media systems 104. |
| 105 | Visor System | A category of near-eye media systems 104 where the device or at least one component of the device is worn on the head 94 of the viewer 96 and the image 880 is displayed in close proximity to the eye 92 of the user 90. Visor systems 105 can also be referred to as visor display systems 105. |
| 106 | VRD Visor System | VRD stands for a virtual retinal display. VRDs can also be referred to as retinal scan displays ("RSD") and as retinal projectors ("RP"). VRD projects the image 880 directly onto the retina of the eye 92 of the viewer 96. A VRD Visor System 106 is a visor system 105 that utilizes a VRD to display the image 880 on the eyes 92 of the user 90. A VRD visor system 106 can also be referred to as a VRD visor display system 106. |
| 110 | Apparatus | An at least substantially integrated device that provides the functionality of the system 100. The apparatus 110 can include the illumination assembly 200, the imaging assembly 300, and the projection assembly 400. In some embodiments, the apparatus 110 includes the media player 848 that plays the media content 840. In other embodiments, the apparatus 110 does not include the media player 848 that plays the media content 840. Different configurations and connection technologies can provide varying degrees of "plug and play" connectivity that can be easily installed and removed by users 90. |
| 111 | Giant Apparatus | An apparatus 110 implementing an embodiment of a giant system 101. Common examples of a giant apparatus 111 include the scoreboards at a professional sports stadium or arena. |

-continued

| # | Name | Definition/Description |
|---|---|---|
| 112 | Large Apparatus | An apparatus 110 implementing an embodiment of a large system 102. Common examples of large apparatuses 111 include movie theater projectors and large screen television sets. A large apparatus 111 is typically positioned on a floor or some other support structure. A large apparatus 111 such as a flat screen TV can also be mounted on a wall. |
| 113 | Personal Media Apparatus | An apparatus 110 implementing an embodiment of a personal system 103. Many personal apparatuses 112 are highly portable and are supported by the user 90. Other embodiments of personal media apparatuses 113 are positioned on a desk, table, or similar surface. Common examples of personal apparatuses 113 include desktop computers, laptop computers, and portable televisions. |
| 114 | Near-Eye Apparatus | An apparatus 110 implementing an embodiment of a near-eye system 104. Many near-eye apparatuses 114 are either worn on the head (are visor apparatuses 115) or are held in the hand of the user 90. Examples of near-eye apparatuses 114 include smart phones, tablet computers, camera eye-pieces and displays, microscope eye-pieces and displays, gun scopes, and other similar devices. |
| 115 | Visor Apparatus | An apparatus 110 implementing an embodiment of a visor system 105. The visor apparatus 115 is worn on the head 94 of the user 90. The visor apparatus 115 can also be referred simply as a visor 115. |
| 116 | VRD Visor Apparatus | An apparatus 110 in a VRD visor system 106. Unlike a visor apparatus 114, the VRD visor apparatus 115 includes a virtual retinal display that projects the visual image 200 directly on the eyes 92 of the user 90. A VRD visor apparatus 116 is disclosed in U.S. Pat. No. 8,982,014, the contents of which are incorporated by reference in their entirety. |
| 120 | Operating Modes | Some embodiments of the system 100 can be implemented in such a way as to support distinct manners of operation. In some embodiments of the system 100, the user 90 can explicitly or implicitly select which operating mode 120 controls. In other embodiments, the system 100 can determine the applicable operating mode 120 in accordance with the processing rules of the system 100. In still other embodiments, the system 100 is implemented in such a manner that supports only one operating mode 120 with respect to a potential feature. For example, some systems 100 can provide users 90 with a choice between an immersion mode 121 and an augmentation mode 122, while other embodiments of the system 100 may only support one mode 120 or the other. |
| 121 | Immersion | An operating mode 120 of the system 100 in which the outside world is at least substantially blocked off visually from the user 90, such that the images 880 displayed to the user 90 are not superimposed over the actual physical environment of the user 90. In many circumstances, the act of watching a movie is intended to be an immersive experience. |
| 122 | Augmentation | An operating mode 120 of the system 100 in which the image 880 displayed by the system 100 is added to a view of the physical environment of the user 90, i.e. the image 880 augments the real world. Google Glass is an example of an electronic display that can function in an augmentation mode. |
| 123 | Observation Level | A degree of magnitude to which the outside world is allowed to be perceived by the viewer 96. By way of example, full immersion mode 121 involves an observation level 123 of 0% and a full augmentation mode 122 involves an observation level of 100%. The system 100 can be implemented to support an augmentation mode 122 that supports the capability of setting the observation level 123 in between the extremes of 0% and 100%. |
| 126 | Sensing | An operating mode 120 of the system 100 in which the system 100 captures information about the user 90 through one or more sensors. Examples of different categories of sensing can include eye tracking pertaining to the user's interaction with the displayed image 880, biometric scanning such as retina scans to determine the identity of the user 90, and other types of sensor readings/measurements. |
| 127 | Non-Sensing | An operating mode 120 of the system 100 in which the system 100 does not capture information about the user 90 or the user's experience with the displayed image 880. |
| 140 | Display Technology | A technology for displaying images. The system 100 can be implemented using a wide variety of different display technologies. Examples of display technologies 140 include digital light processing (DLP), liquid crystal display (LCD), and liquid crystal on silicon (LCOS). |
| 141 | DLP System | An embodiment of the system 100 that utilizes digital light processing (DLP) to compose an image 880 from light 800. |
| 142 | LCD System | An embodiment of the system 100 that utilizes liquid crystal display (LCD) to compose an image 880 from light 800. |
| 143 | LCOS System | An embodiment of the system 100 that utilizes liquid crystal on silicon (LCOS) to compose an image 880 from light 800. |

-continued

| # | Name | Definition/Description |
|---|---|---|
| 150 | Supporting Components | Regardless of the context and configuration, a system 100 like any electronic display is a complex combination of components and processes. Light 800 moves quickly and continuously through the system 100. Various supporting components 150 are used in different embodiments of the system 100. A significant percentage of the components of the system 100 can fall into the category of supporting components 150 and many such components 150 can be collectively referred to as "conventional optics". Supporting components 160 are necessary in any implementation of the system 100 in that light 800 is an important resource that must be controlled, constrained, directed, and focused to be properly harnessed in the process of transforming light 800 into an image 880 that is displayed to the user 90. The text and drawings of a patent are not intended to serve as product blueprints. One of ordinary skill in the art can devise multiple variations of supplementary components 150 that can be used in conjunction with the innovative elements listed in the claims, illustrated in the drawings, and described in the text. |
| 151 | Mirror | An object that possesses at least a non-trivial magnitude of reflectivity with respect to light. Depending on the context, a particular mirror could be virtually 100% reflective while in other cases merely 50% reflective. Mirrors 151 can be comprised of a wide variety of different materials. |
| 152 | Dichroic Mirror | A mirror 151 with significantly different reflection or transmission properties at two different wavelengths. |
| 160 | Lens | An object that possesses at least a non-trivial magnitude of transmissivity. Depending on the context, a particular lens could be virtually 100% transmissive while in other cases merely about 50% transmissive. A lens 160 is often used to focus light 800. |
| 170 | Collimator | A device that narrows a beam of light 800. |
| 180 | Plate | An object that possesses a non-trivial magnitude of reflectiveness and transmissivity. |
| 190 | Processor | A central processing unit (CPU) that is capable of carrying out the instructions of a computer program. The system 100 can use one or more processors 190 to communicate with and control the various components of the system 100. |
| 191 | Power Source | A source of electricity for the system 100. Examples of power sources include various batteries as well as power adaptors that provide for a cable to provide power to the system 100. Different embodiments of the system 100 can utilize a wide variety of different internal and external power sources. 191. Some embodiments can include multiple power sources 191. |
| 200 | Illumination Assembly | A collection of components used to supply light 800 to the imaging assembly 300. Common example of components in the illumination assembly 200 include light sources 210 and diffusers. The illumination assembly 200 can also be referred to as an illumination subsystem 200. |
| 210 | Light Source | A component that generates light 800. There are a wide variety of different light sources 210 that can be utilized by the system 100. |
| 211 | Multi-Prong Light Source | A light source 210 that includes more than one illumination element. A 3-colored LED lamp 213 is a common example of a multi-prong light source 212. |
| 212 | LED Lamp | A light source 210 comprised of a light emitting diode (LED). |
| 213 | 3 LED Lamp | A light source 210 comprised of three light emitting diodes (LEDs). In some embodiments, each of the three LEDs illuminates a different color, with the 3 LED lamp eliminating the use of a color wheel. |
| 214 | Laser | A light source 210 comprised of a device that emits light through a process of optical amplification based on the stimulated emission of electromagnetic radiation. |
| 215 | OLED Lamp | A light source 210 comprised of an organic light emitting diode (OLED). |
| 216 | CFL Lamp | A light source 210 comprised of a compact fluorescent bulb. |
| 217 | Incandescent Lamp | A light source 210 comprised of a wire filament heated to a high temperature by an electric current passing through it. |
| 218 | Non-Angular Dependent Lamp | A light source 210 that projects light that is not limited to a specific angle. |
| 219 | Arc Lamp | A light source 210 that produces light by an electric arc. |
| 230 | Light Location | A location of a light source 210, i.e. a point where light originates. Configurations of the system 100 that involve the projection of light from multiple light locations 230 can enhance the impact of the diffusers 282. |
| 300 | Imaging Assembly | A collective assembly of components, subassemblies, processes, and light 800 that are used to fashion the image 880 from light 800. In many instances, the image 880 initially fashioned by the imaging assembly 300 can be modified in certain ways as it is made accessible to the user 90. The modulator 320 is the component of the imaging |

| # | Name | Definition/Description |
|---|---|---|
| | | assembly 300 that is primarily responsible for fashioning an image 880 from the light 800 supplied by the illumination assembly 200. |
| 310 | Prism | A substantially transparent object that often has triangular bases. Some display technologies 140 utilize one or more prisms 310 to direct light 800 to a modulator 320 and to receive an image 880 or interim image 850 from the modulator 320. |
| 311 | TIR Prism | A total internal reflection (TIR) prism 310 used in a DLP 141 to direct light to and from a DMD 324. |
| 312 | RTIR Prism | A reverse total internal reflection (RTIR) prism 310 used in a DLP 141 to direct light to and from a DMD 324. |
| 320 | Modulator or Light Modulator | A device that regulates, modifies, or adjusts light 800. Modulators 320 form an image 880 or interim image 850 from the light 800 supplied by the illumination assembly 200. Common categories of modulators 320 include transmissive-based light modulators 321 and reflection-based light modulators 322. |
| 321 | Transmissive-Based Light Modulator | A modulator 320 that fashions an image 880 from light 800 utilizing a transmissive property of the modulator 320. LCDs are a common example of a transmissive-based light modulator 321. |
| 322 | Reflection-Based Light Modulator | A modulator 320 that fashions an image 880 from light 800 utilizing a reflective property of the modulator 320. Common examples of reflection-based light modulators 322 include DMDs 324 and LCOSs 340. |
| 324 | DMD | A reflection-based light modulator 322 commonly referred to as a digital micro mirror device. A DMD 324 is typically comprised of a several thousand microscopic mirrors arranged in an array on a processor 190, with the individual microscopic mirrors corresponding to the individual pixels in the image 880. |
| 330 | LCD Panel or LCD | A light modulator 320 in an LCD (liquid crystal display). A liquid crystal display that uses the light modulating properties of liquid crystals. Each pixel of an LCD typically consists of a layer of molecules aligned between two transparent electrodes, and two polarizing filters (parallel and perpendicular), the axes of transmission of which are (in most of the cases) perpendicular to each other. Without the liquid crystal between the polarizing filters, light passing through the first filter would be blocked by the second (crossed) polarizer. Some LCDs are transmissive while other LCDs are transflective. |
| 340 | LCOS Panel or LCOS | A light modulator 320 in an LCOS (liquid crystal on silicon) display. A hybrid of a DMD 324 and an LCD 330. Similar to a DMD 324, except that the LCOS 326 uses a liquid crystal layer on top of a silicone backplane instead of individual mirrors. An LCOS 244 can be transmissive or reflective. |
| 350 | Dichroid Combiner Cube | A device used in an LCOS or LCD display that combines the different colors of light 800 to formulate an image 880 or interim image 850. |
| 400 | Projection Assembly | A collection of components used to make the image 880 accessible to the user 90. The projection assembly 400 includes a display 410. The projection assembly 400 can also include various supporting components 150 that focus the image 880 or otherwise modify the interim image 850 transforming it into the image 880 that is displayed to one or more users 90. The projection assembly 400 can also be referred to as a projection subsystem 400. |
| 410 | Display or Screen | An assembly, subassembly, mechanism, or device by which the image 880 is made accessible to the user 90. Examples of displays 410 include active screens 412, passive screens 414, eyepieces 416, and VRD eyepieces 418. |
| 412 | Active Screen | A display screen 410 powered by electricity that displays the image 880. |
| 414 | Passive Screen | A non-powered surface on which the image 880 is projected. A conventional movie theater screen is a common example of a passive screen 412. |
| 416 | Eyepiece | A display 410 positioned directly in front of the eye 92 of an individual user 90. |
| 418 | VRD Eyepiece or VRD Display | An eyepiece 416 that provides for directly projecting the image 880 on the eyes 92 of the user 90. A VRD eyepiece 418 can also be referred to as a VRD display 418. |
| 420 | Curved Mirror | An at least partially reflective surface that in conjunction with the splitting plate 430 projects the image 880 onto the eye 92 of the viewer 96. The curved mirror 420 can perform additional functions in embodiments of the system 100 that include a sensing mode 126 and/or an augmentation mode 122. |
| 430 | Splitting Plate | A partially transparent and partially reflective plate that in conjunction with the curved mirror 420 can be used to direct the image 880 to the user 90 while simultaneously tracking the eye 92 of the user 90. |
| 500 | Sensor Assembly | The sensor assembly 500 can also be referred to as the tracking assembly 500, because a common category of sensor assemblies 500 will include the capability of tracking the eye movement of the viewer |

-continued

| # | Name | Definition/Description |
|---|---|---|
| | | 96 in the context of a visor system 105 or other form of near-eye system 104. |
| 510 | Sensor | A sensor 510 is a device that can capture information about the user 90 or the operating environment of the system 100. A common example of a sensor 510 is a camera that captures information about the eye 92 of the viewer 96. In many eye-tracking embodiments, the sensor 510 will be an infrared camera, or otherwise utilize light 800 that is outside the visible spectrum. |
| 520 | Lamp | A light source for the sensor 510. By way of example, an infra-red camera sensor 510 can benefit from an infra-red lamp 520. |
| 530 | Eye-Tracking Attribute | Information about the eye 92 of the viewer 96 that is captured by the sensor assembly 500. This information can include which areas of the image 880 that a viewer 96 is focusing on. |
| 700 | Tuning Assembly | A collection of one or more components that move the focal point 870 of light 800 in the image 880 delivered to the viewer 96. The tuning assembly 700 can be comprised of a movable tuning lens 710, a tunable lens array 720, a movable lens 730, or a deformable mirror 740. |
| 710 | Tunable Lens | A lens 160 capable of adjusting the focal point 870 of light 800 faster than the human eye can perceive. A tunable lens 710 can change the focal point 870 of light 800 by changing the curvature 711 of the lens 710. |
| 711 | Curvature | The attribute of a lens 160 that determines the impact of the lens 160 on the trajectory of the light 800 passing through it. The curvature of a lens 160 can be concave or convex. A tunable lens 710 is a lens 160 with dynamically changing curvature 711. |
| 712 | Deformable Lens | A tunable lens 710 that can have its curvature changed through deformation. An example of a deformable lens 712 is a liquid lens 714. |
| 714 | Liquid Lens | A deformable lens 712 with a modifiable curvature 711. Typically modifications are done through electrical or electromagnetic means. |
| 716 | Liquid Crystal | A tunable lens 710 where the curvature is changed through the rearranging of liquid crystals making up the lens 710. |
| 720 | Tunable Lens Array | An array of lenses 160 that in the aggregate function as a tuning lens 710. Light 800 is directed to different lenses 160 with different curvatures 711, causing the light 800 passing through to have different focal points 870. |
| 724 | Splitter | A component that can cause light 800 to travel different paths. Splitters 724 can be used within a tunable lens array 720 to direct light 800 towards different lenses 160 with different curvatures 711 resulting in different focal points 870. |
| 730 | Movable Lens | A lens 160 that changes position in order to change the focal point 870 of the light 800 passing through the lens 160. A movable lens 730 can move on a track/rail 734 to different positions 732. |
| 732 | Position | A location of a movable lens 732. |
| 734 | Track/Rail | An architecture that facilitates the movement of the movable lens 730 between different positions 732. |
| 740 | Deformable Mirror | A mirror with a tunable radius of curvature. |
| 800 | Light | Light 800 is the media through which an image is conveyed, and light 800 is what enables the sense of sight. Light is electromagnetic radiation that is propagated in the form of photons. Light can be coherent light 802, partially coherent light 803, or non-coherent light 804. |
| 840 | Media Content | The image 880 displayed to the user 90 by the system 100 can in many instances, be but part of a broader media experience. A unit of media content 840 will typically include visual attributes 841 and acoustic attributes 842. Tactile attributes 843 are not uncommon in certain contexts. It is anticipated that the olfactory attributes 844 and gustatory attributes 845 may be added to media content 840 in the future. |
| 841 | Visual Attributes | Attributes pertaining to the sense of sight. The core function of the system 100 is to enable users 90 to experience visual content such as images 880 or video 890. In many contexts, such visual content will be accompanied by other types of content, most commonly sound or touch. In some instances, smell or taste content may also be included as part of the media content 840. |
| 842 | Acoustic Attributes | Attributes pertaining to the sense of sound. The core function of the system 100 is to enable users 90 to experience visual content such as images 880 or video 890. However, such media content 840 will also involve other types of senses, such as the sense of sound. The system 100 and apparatuses 110 embodying the system 100 can include the ability to enable users 90 to experience tactile attributes 843 included with other types of media content 840. |

-continued

| # | Name | Definition/Description |
|---|---|---|
| 843 | Tactile Attributes | Attributes pertaining to the sense of touch. Vibrations are a common example of media content 840 that is not in the form of sight or sound. The system 100 and apparatuses 110 embodying the system 100 can include the ability to enable users 90 to experience tactile attributes 843 included with other types of media content 840. |
| 844 | Olfactory Attributes | Attributes pertaining to the sense of smell. It is anticipated that future versions of media content 840 may include some capacity to engage users 90 with respect to their sense of smell. Such a capacity can be utilized in conjunction with the system 100, and potentially integrated with the system 100. The iPhone app called oSnap is a current example of gustatory attributes 845 being transmitted electronically. |
| 845 | Gustatory Attributes | Attributes pertaining to the sense of taste. It is anticipated that future versions of media content 840 may include some capacity to engage users 90 with respect to their sense of taste. Such a capacity can be utilized in conjunction with the system 100, and potentially integrated with the system 100. |
| 848 | Media Player | The system 100 for displaying the image 880 to one or more users 90 may itself belong to a broader configuration of applications and systems. A media player 848 is device or configuration of devices that provide the playing of media content 840 for users. Examples of media players 848 include disc players such as DVD players and BLU-RAY players, cable boxes, tablet computers, smart phones, desktop computers, laptop computers, television sets, and other similar devices. Some embodiments of the system 100 can include some or all of the aspects of a media player 848 while other embodiments of the system 100 will require that the system 100 be connected to a media player 848. For example, in some embodiments, users 90 may connect a VRD apparatus 116 to a BLU-RAY player in order to access the media content 840 on a BLU-RAY disc. In other embodiments, the VRD apparatus 116 may include stored media content 840 in the form a disc or computer memory component. Non-integrated versions of the system 100 can involve media players 848 connected to the system 100 through wired and/or wireless means. |
| 850 | Interim Image | The image 880 displayed to user 90 is created by the modulation of light 800 generated by one or light sources 210 in the illumination assembly 200. The image 880 will typically be modified in certain ways before it is made accessible to the user 90. Such earlier versions of the image 880 can be referred to as an interim image 850. |
| 852 | Subframe | A portion or subset of the image 880 or interim image 860. A single image 880 can be comprised of many subframes 852. |
| 854 | Subframe Sequence | The order in which the subframes 852 making up an image 880 or interim image 850 are illuminated. |
| 860 | Depth Region | A subset of an image 880 or interim image 850 that is comprised of light 800 within the same range of focal length 870, i.e. the. The tuning lens 710 does not need to move to focus light 800 pertaining to the same depth region 860. |
| 870 | Focal Point | A location or point in space in which light 800 comes into focus. i.e. where the various rays of light 800 either converge or diverge. |
| 871 | Focal Length | The distance between a lens 160 or other similar optic device and the focal point 870 is the focal length 871. The focal length of an optical system is a measure of how strongly the system converges or diverges light. For an optical system in air, it is the distance over which initially collimated rays are brought to a focus. A system with a shorter focal length has greater optical power than one with a long focal length; that is, it bends the rays more strongly, bringing them to a focus in a shorter distance. In most photography and all telescopy, where the subject is essentially infinitely far away, longer focal length (lower optical power) leads to higher magnification and a narrower angle of view; conversely, shorter focal length or higher optical power is associated with a wider angle of view. On the other hand, in applications such as microscopy in which magnification is achieved by bringing the object close to the lens, a shorter focal length (higher optical power) leads to higher magnification because the subject can be brought closer to the center of projection |
| 880 | Image | A visual representation such as a picture or graphic. The system 100 performs the function of displaying images 880 to one or more users 90. During the processing performed by the system 100, light 800 is modulated into an interim image 850, and subsequent processing by the system 100 can modify that interim image 850 in various ways. At the end of the process, with all of the modifications to the interim image 850 being complete the then final version of the interim image 850 is no longer a work in process, but an image 880 that is displayed to the user 90. In the context of a video 890, each image 880 can be referred to as a frame 882. |

| # | Name | Definition/Description |
|---|---|---|
| 881 | Stereoscopic Image | A dual set of two dimensional images 880 that collectively function as a three dimensional image. |
| 882 | Frame | An image 880 that is a part of a video 890. |
| 890 | Video | In some instances, the image 880 displayed to the user 90 is part of a sequence of images 880 can be referred to collectively as a video 890. Video 890 is comprised of a sequence of static images 880 representing snapshots displayed in rapid succession to each other. Persistence of vision in the user 90 can be relied upon to create an illusion of continuity, allowing a sequence of still images 880 to give the impression of motion. The entertainment industry currently relies primarily on frame rates between 24 FPS and 30 FPS, but the system 100 can be implemented at faster as well as slower frame rates. |
| 900 | Method | A process for displaying an image 880 to a user 90. |
| 910 | Illumination Method | A process for generating light 800 for use by the system 100. The illumination method 910 is a process performed by the illumination assembly 200. |
| 920 | Imaging Method | A process for generating an interim image 850 from the light 800 supplied by the illumination assembly 200. The imaging method 920 can also involve making subsequent modifications to the interim image 850. |
| 930 | Display Method | A process for making the image 880 available to users 90 using the interim image 850 resulting from the imaging method 920. The display method 930 can also include making modifications to the interim image 850. |
| 940 | Tuning Method | Dynamically changing the focal length 870 faster than the human eye can perceived. |
| 942 | Pre-defined Tuning Method | Tuning method 940 utilizing depth regions 860 in the image 880. |
| 944 | Attention-based Tuning Method | Tuning method 940 based on the perceived attention of the viewer 96, such as retina tracking. |
| 946 | Hybrid Tuning Method | Tuning method 940 based on depth regions 860 and the perceived attention of the viewer 96. |

The invention claimed is:

1. A system (100) for displaying an image (880) to a user (90), said system (100) comprising:
an illumination assembly (200) that provides for supplying a plurality of light (800);
an imaging assembly (300) that provides for creating an interim image (850) comprised from said light (800);
a projection assembly (400) that provides for creating said image (880) from said light (800) in said interim image (850), wherein said projection assembly (400) provides for making said image (880) accessible to the user (90); and
a tuning assembly (700) that provides for a plurality of focal points (870) in said plurality of light (800) in a single image (880).

2. The system (100) of claim 1, wherein said tuning assembly (700) is comprised of tunable lens (710).

3. The system (100) of claim 1, wherein said tuning assembly (700) is comprised of tunable lens array (720).

4. The system (100) of claim 1, wherein said tuning assembly (700) is comprised of a movable lens (730).

5. The system (100) of claim 1, wherein said tuning assembly (700) is comprised of a deformable mirror (740).

6. The system (100) of claim 1, wherein said image (800) is a stereoscopic image (881) that is part of a stereoscopic video (891).

7. The system (100) of claim 1, wherein said system (100) is a VRD visor apparatus (116).

8. The system (100) of claim 1, wherein said tuning assembly (700) is positioned in at least one of:
(a) said illumination assembly (200);
(b) said imaging assembly (300); and
(c) said projection assembly (400).

9. The system (100) of claim 1, wherein said image (880) includes a plurality of depth regions (860), said plurality of depth regions (860) including a first depth region (860) and a second depth region (860), said plurality of focal points (870) including a first focal point (870) and a second focal point (870), wherein said light (800) in said first depth region (860) has said first focal point (870), and wherein said light (800) in said second depth region (860) has said second focal point (870).

10. The system (100) of claim 1, wherein said image (880) includes a plurality of depth regions (860), and wherein said plurality of depth regions (860) include plurality of pre-defined depth regions (861).

11. The system (100) of claim 1, wherein said image (880) includes a plurality of depth regions (860), and wherein said plurality of depth regions (860) are selectively influenced by an eye-tracking attribute (530) pertaining to the user (90).

12. The system (100) of claim 1, wherein said image (880) includes a plurality of depth regions (860), wherein said plurality of depth regions (860) include plurality of pre-defined depth regions (861), and wherein said plurality of pre-defined depth regions (861) are selectively influenced by an eye-tracking attribute (530) pertaining to the user (90).

13. The system (100) of claim 1, wherein said image (880) is comprised of a plurality of subframes (852) displayed in a subframe sequence (854) wherein said plurality of subframes (852) includes a first subframe (852) and a second subframe (852), wherein said image (880) is comprised of a plurality of depth regions (860), said plurality of depth regions (860) including a first depth region (860) and a second depth region (860), wherein said tuning assembly (700) further provides for a plurality of focal points (870) of said light (800), said plurality of focal points (870) including a first focal point (870) for said first subframe (852) comprising said first depth region (860) and a second focal point (870) for said second subframe (852) comprising said second depth region (860).

14. The system (100) of claim 1, wherein said image (880) includes a plurality of depth regions (860), said plurality of depth regions (860) including a first depth region (860) perceived as being less than about 3 feet from the user (90), a second depth region (860) perceived as being between about 3-5 feet from the user (90), a third depth region (860) perceived as being between about 5-8 feet from the user (90), a fourth depth region (860) perceived as being between about 8-12 feet from the user (90), and a fifth depth region (860) perceived as being about 12 feet or further from the user (90).

15. The system of claim 1, wherein said image (880) is comprised by a plurality of depth regions (860), said system (100) further comprising a sensor assembly (500) that provides for capturing an eye tracking attribute (530) pertaining to the user (90), wherein said eye tracking attribute (530) dynamically influences the number of said depth regions (880).

16. The system of claim 1, wherein said plurality of focal points (870) includes one focal point (870) with an at least substantially infinite focal length.

17. A system (100) for displaying an image (880) to a user (90), said system (100) comprising:
an illumination assembly (200) that includes a light source (210) that provides for supplying a plurality of light (800) used to comprise said image (880);
an imaging assembly (300) that includes a modulator (320) that provides for creating an interim image (850) comprised from said light (800) provided by said illumination assembly (200);
a projection assembly (400) that provides for creating said image (880) from said light (800) in said interim image (850), wherein said projection assembly (400) provides for making said image (880) accessible to the user (90), and wherein said projection assembly (400) includes a curved mirror (420) and a splitter plate (430); and
a tuning assembly (700) that provides for modifying said light (800) to include a plurality of focal points (870), said tuning assembly (700) including at least one of: (a) a tunable lens (710); (b) a tunable lens array (720); (c) a movable lens (730); and (d) a deformable mirror (740);
wherein said image (880) is comprised of a plurality of subframes (852), each of the plurality of subframes (852) associated with one of a plurality of depth regions, each of the plurality of depth regions (860) having a different one of the plurality of focal points (870).

18. The system (100) of claim 17, said system (100) further comprising a sensor assembly (500), wherein said light (800) in said image (880) is comprised of a plurality of depth regions (860) and a plurality of focal points (870), wherein said first depth region (860) is at least substantially comprised of a light (800) with said first focal point (870), and wherein said second depth region (860) is at least substantially comprised of light (800) with said second focal point (870), wherein at least one said focal point (870) has an at least substantially infinite focal length, wherein said sensor assembly (500) uses said curved mirror (420) and said splitter plate (430) to capture an eye tracking attribute (530) from the user (90), and wherein said eye tracking attribute (530) selectively influences at least one said focal point (870).

19. The system (100) of claim 17, wherein said system (100) is a VRD visor apparatus (116) that provides for displaying a stereoscopic video (891).

20. A method (900) for displaying an image (880) to a user (90), said method (900) comprising:
supplying (910) the light (800) used to make the image (880);
modulating (920) the light (800) used to comprise the image (880);
modifying (940) the light (800) used to comprise the image (880) utilizing a tuning assembly so that the light (800) in said image (880) includes a plurality of depth regions (860) with a plurality of focal points (870) in a single image.

21. The method (900) of claim 20, wherein said image (880) is comprised of a plurality of subframes (852), each of the plurality of subframes associated with one of the plurality of depth regions, each of the plurality of depth regions (860) having a different one of the plurality of focal points (870).

* * * * *